United States Patent
Gotoh et al.

(10) Patent No.: US 7,365,810 B2
(45) Date of Patent: Apr. 29, 2008

(54) DISPLAY DEVICE AND METHOD FOR PRODUCTION THEREOF

(75) Inventors: Hiroshi Gotoh, Kobe (JP); Toshihiro Kugimiya, Kobe (JP); Katsufumi Tomihisa, Kobe (JP); Junichi Nakai, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 475 days.

(21) Appl. No.: 11/153,331

(22) Filed: Jun. 16, 2005

(65) Prior Publication Data

US 2006/0007366 A1 Jan. 12, 2006

(30) Foreign Application Priority Data

Jul. 6, 2004 (JP) ............... 2004-199576

(51) Int. Cl.
*G02F 1/133* (2006.01)

(52) U.S. Cl. .............................. 349/43; 349/139

(58) Field of Classification Search .................. 349/43
See application file for complete search history.

(56) References Cited

U.S. PATENT DOCUMENTS

| | | | |
|---|---|---|---|
| 5,514,909 A | 5/1996 | Yamamoto et al. | |
| 5,929,487 A * | 7/1999 | Fukada et al. | ............... 257/347 |
| 6,033,542 A | 3/2000 | Yamamoto et al. | |
| 6,216,206 B1 | 4/2001 | Inoue et al. | |
| 6,252,247 B1 | 6/2001 | Sakata et al. | |
| 2004/0126608 A1 | 7/2004 | Gotoh et al. | |
| 2006/0007366 A1 | 1/2006 | Gotoh et al. | |
| 2007/0102818 A1* | 5/2007 | Sasaki et al. | ............... 257/751 |

FOREIGN PATENT DOCUMENTS

| | | |
|---|---|---|
| JP | 11-283934 | 10/1999 |
| JP | 11-284195 | 10/1999 |
| JP | 11-337976 | 12/1999 |

OTHER PUBLICATIONS

U.S. Appl. No. 11/743,916, filed May 3, 2007, Kawakami et al.
U.S. Appl. No. 11/461,907, filed Aug. 2, 2006, Kawakami et al.

(Continued)

*Primary Examiner*—James A. Dudek
(74) *Attorney, Agent, or Firm*—Oblon, Spivak, McClelland, Maier & Neustadt, P.C.

(57) ABSTRACT

A display device and a method for production thereof. The display device comprises a substrate, thin film transistors and a transparent conductive film which are formed on the substrate, and an aluminum alloy film which electrically connects the thin film transistors to the transparent conductive film, such that there exists an oxide film of said aluminum alloy at the interface between said aluminum alloy film and said transparent conductive film, said oxide film having a thickness of 1 to 10 nm and containing oxygen in an amount no more than 44 atom %. The display device has the aluminum alloy film and the transparent conducive film in direct contact with each other, obviating the necessity of barrier metal between them.

10 Claims, 14 Drawing Sheets

OTHER PUBLICATIONS

U.S. Appl. No. 11/461,927, filed Aug. 2, 2006, Kugimiya et al.
U.S. Appl. No. 11/431,580, filed May 11, 2006, Kugimiya et al.
U.S. Appl. No. 11/377,266, filed Mar. 17, 2006, Takagi et al.
U.S. Appl. No. 11/349,520, filed Feb. 8, 2006, Gotoh et al.
U.S. Appl. No. 11/341,531, filed Jan. 30, 2006, Kugimiya et al.
U.S. Appl. No. 11/153,331, filed Jun. 16, 2005, Gotoh et al.
U.S. Appl. No. 11/106,439, filed Apr. 15, 2005, Gotoh et al.
U.S. Appl. No. 11/091,442, filed Mar. 29, 2005, Hiroshi Gotoh et al.

* cited by examiner

TEM PHOTOGRAPH SHOWING THE OXIDE LAYER AND THE Ni-CONCENTRATED LAYER WHICH ARE FORMED IN THE INTERFACE OF DIRECT CONTACT BETWEEN ITO AND Al-Ni ALLOY

DISPLAY DEVICE AND METHOD FOR PRODUCTION THEREOF

BACKGROUND OF THE INVENTION

1. Field of the Invention

The present invention relates to a display device in thin film form and a method for production thereof. More particularly, the present invention relates to a new display device including a transparent conductive film and an aluminum alloy film as constituents, which are used for flat panel displays (such as liquid crystal display) of active or passive matrix type, reflecting film, and optical parts, and a method for production thereof.

2. Description of the Related Art

A liquid crystal display device of active matrix type is composed of two mutually opposing substrates and a liquid crystal layer held between them. It relies on thin film transistors (TFT) as switching devices. The first substrate has a transparent conductive film and an array of TFTs connected to scanning lines and signal lines. The second substrate, which is a certain distance away from the first one, has a common electrode. By contrast, a liquid crystal display device of passive matrix type is also composed of two mutually opposing substrates and a liquid crystal layer held between them. The first substrate for wiring has scanning lines and signal lines. The second substrate, which is a certain distance away from the first one, has a common electrode. The transparent conductive film is formed from indium tin oxide (ITO) which is indium oxide ($In_2O_3$) doped with about 10 wt % of tin oxide (SnO).

The signal lines are formed from pure aluminum or aluminum alloy (such as Al—Nd), and they are electrically connected to the transparent conductive film via refractory barrier metal such as Mo, Cr, Ti, and W. However, omission of barrier metal for direct connection of the signal lines to the transparent conductive film is now under study.

It is shown in Patent Document 1 that direct contact between signal lines and transparent conductive film is possible if the latter is formed form IZO (indium oxide doped with about 10 wt % of zinc oxide).

It has been confirmed that contact resistance between the signal lines and the transparent conductive film can be kept low even though the above-mentioned refractory metal is omitted so long as the drain electrode undergoes surface treatment by exposure to plasma or by ion implantation (as disclosed in Patent Document 2) or the gate, source, and drain electrodes have two-layered structure, with the second layer containing an impurity such as N, O, Si, and C (as disclosed in Patent Document 3).

Patent Document 1:

Japanese Patent Laid-open No. Hei-11-337976

Patent Document 2:

Japanese Patent Laid-open No. Hei-11-283934

Patent Document 3:

Japanese Patent Laid-open No. Hei-11-284195

OBJECT AND SUMMARY OF THE INVENTION

The conventional technology mentioned above necessitates the presence of barrier metal in order to avoid direct contact between signal lines (formed from aluminum or aluminum alloy) and the transparent conductive film because direct contact increases contact resistance and deteriorates display quality. This problem arises from the fact that aluminum is easily oxidized by oxygen in the atmosphere and also by oxygen which is released or added when the transparent conducive film (in the form of metal oxide) is formed. This oxidation forms a surface layer of high-resistance aluminum oxide. The insulation layer thus formed in the interface between the signal lines and the transparent conductive film increases the contact resistance between them and deteriorates the display quality.

Barrier metal is originally intended to protect aluminum alloy from surface oxidation and to achieve good contact between the aluminum alloy film and the transparent conductive film. The conventional structure (having barrier metal formed on the contact interface) inevitably needs a barrier metal forming step. This means that the production facility needs a chamber to form the barrier metal film in addition to the sputtering apparatus to form the gate, source, and drain electrodes. Such an additional apparatus increases production cost and decreases productivity to an unignorable extent in mass production of low-price liquid crystal panels.

For this reason there has recently arisen a demand for a new material and process that permit the omission of barrier metal. This demand, however, is not met by the technologies disclosed in Patent Documents 2 and 3 mentioned above. The former needs an additional step for surface treatment and the latter also needs additional steps although it can form the gate, source, and drain electrodes continuously in the same chamber. This advantage is cancelled by the necessity of frequent suspension for maintenance to clean the chamber after continuous operation for a certain period of time. (Film sticking to the inside of the chamber peels off because it varies in the coefficient of thermal expansion depending on the content of impurities.) The technology disclosed in Patent Document 1 requires the replacement of ITO film (which is most common at the present time) by IZO film, and this leads to an increase in material cost.

With the foregoing in mind, the present inventors carried out extensive studies to establish a new technology which permits direct, secure contact between the aluminum alloy film and the transparent conductive film without barrier metal in a simple process and which also provides a material having both good electrical properties (low resistivity and low contact resistance) and good hillock and void resistance, said material being used in common for the reflecting electrode and TAB connecting electrode in the display device. As the result, the present inventors developed a new technology which permits direct contact between the wiring and the transparent conductive film, with no refractory metal interposed between them, and they had filed it for patent (Japanese Patent Application No. 2002-368786).

The present inventors continued their investigation for further improvement from a different point of view. It is an object of the present invention to provide a technology for aluminum alloy wiring which will realize a contact superior in stability and long-term reliability to that of the previously filed technology.

The display device according to the present invention, which was developed to tackle the above-mentioned problem, is composed of a substrate, thin film transistors and a transparent conductive film which are formed on the substrate, and an aluminum alloy film which electrically connects the thin film transistors to the transparent conductive film. Between the aluminum alloy film and the transparent conductive film is an oxide film of said aluminum alloy. The oxide film has a thickness of 1 to 10 nm and contains oxygen in an amount no more than 44 atom %.

The above-mentioned aluminum alloy film should preferably contain at least one species of alloy component selected from Au, Ag, Zn, Cu, Ni, Sr, Sm, Ge, and Bi in an amount of 0.1 to 6 atom %, with Ni being most desirable.

The above-mentioned aluminum alloy film may additionally contain at least one species of alloy component selected from Nd, Y, Fe, Co, Ti, Ta, Cr, Zr, and Hf in an amount of 0.1 to 6 atom %.

The aluminum alloy film containing Ni (as an alloy component) should vary in Ni content across its thickness. In its surface layer (0.5 to 10 nm thick) the Ni content should be higher than twice the average Ni content.

The aluminum alloy film effectively functions as a reflecting film or TAB connecting electrode in the display device. The transparent conductive film should preferably be formed from indium tin oxide (ITO) or indium zinc oxide (IZO).

It is another object of the present invention to provide a display device of passive matrix type, which is composed of a substrate and a transparent conductive film formed thereon. The transparent conductive film is electrically connected via an aluminum alloy film. In the interface between the aluminum alloy film and the transparent conductive film is an oxide film of the aluminum alloy, which has a thickness of 1 to 10 nm and contains oxygen in an amount no more than 44 atom %.

The display device according to the present invention can be produced easily by forming an aluminum alloy film on a substrate and then forming a transparent conductive film on the aluminum alloy film in two steps. The first step is carried out in a non-oxidizing atmosphere, with the substrate kept at a high temperature. The second step is carried out in an oxygen-containing atmosphere.

The present invention realizes direct contact (without barrier metal) between the aluminum alloy film and the transparent conductive film under stable control. Thus it economically provides a display device excelling in performance and long-term reliability.

DESCRIPTION OF THE PREFERRED EMBODIMENTS

The present invention realizes direct contact between the transparent conductive film and the aluminum alloy film by reducing the electrical resistivity (or increasing the electrical conductivity) of the aluminum oxide layer which is formed when they are brought into contact with each other. The reduction of electrical resistivity of the aluminum alloy oxide layer is effectively accomplished by controlling its thickness and oxygen content at the interface.

Incidentally, the conventional technology is designed to bring pure aluminum or Al—Nd alloy into direct contact with the transparent conductive film. The result is non-ohmic contact with a high contact resistance. The reason for this is that an aluminum oxide film, which is formed in the contact interface, is thick and has as high a resistance as aluminum oxide ($Al_2O_3$) of stoichiometric composition.

The present invention differs from the conventional technology mentioned above in that the aluminum alloy layer contains at least one element (as alloy component) selected from the group consisting of Au, Ag, Zn, Cu, Ni, Sr, Sm, Ge, and Bi, particularly Ni in an adequate amount. These alloy components protects aluminum from oxidation when the transparent conductive film is formed and imparts conductivity to the aluminum alloy oxide layer. These alloy components should preferably be concentrated at the contact interface. This contributes to highly stable, reliable contact characteristics (or low contact resistance) for alloys of different composition. The result is a high-quality liquid crystal display device and a considerable reduction in production cost and manufacturing steps.

The display device according to the present invention will be described in more detail with reference to the accompanying drawings, which are not intended to restrict the scope of the invention. The present invention may be changed and modified within the scope thereof.

The aluminum alloy film specified in the present invention may also be applied to a display device of passive matrix type (which has no thin film transistors), a reflecting electrode for liquid crystal display device of reflection type, and a TAB connecting electrode for signal input and output. However, description of their embodiments is omitted hereinafter.

Figure 1:
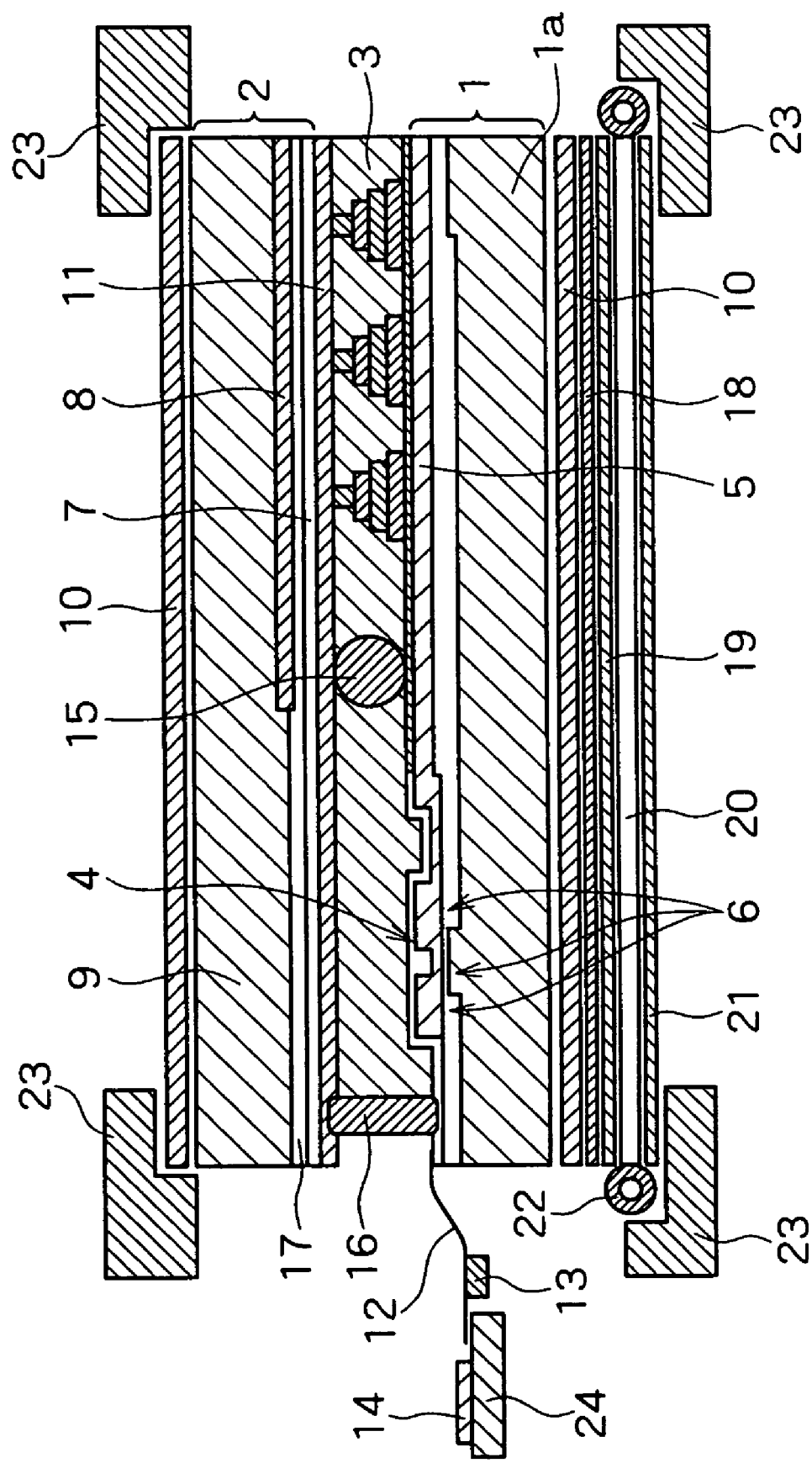
FIG. 1 is a schematic enlarged sectional view illustrating the structure of the liquid crystal panel used for the liquid crystal display device according to the present invention.

FIG. 1 is a schematic enlarged sectional view illustrating the structure of the liquid crystal panel used for the liquid crystal display device according to the present invention.

The liquid crystal panel shown in FIG. 1 is made up of a substrate 1 (with TFT array), an opposing substrate 2 (opposite to substrate 1), and a liquid crystal layer 3 (which is held between the two substrates 1 and 2 and functions as a light modulating layer). The substrate 1 (with TFT array) is composed of an insulating glass substrate 1a, thin film transistors (TFT) 4 arranged thereon, a transparent conductive film 5, and a wiring part 6 including scanning lines and signal lines.

The opposing substrate 2 is composed of a common electrode 7 (formed on the entire surface of the substrate 1 with TFT array), a color filter 8 opposite to the transparent conductive film 5, and a light shielding film 9 opposite to the TFTs 4 (on the substrate 1) and the wiring part 6.

On the outsides of the substrate 1 (with TFT array) and the opposing substrate 2 are arranged polarizers 10 and 10. On the inside of the opposing substrate 2 is arranged an alignment layer 11 which orients the liquid crystal molecules in the liquid crystal layer 3.

The liquid crystal panel constructed as mentioned above works in the following manner. An electric field is formed between the opposing electrode 2 and the transparent conductive film 5. It controls the direction of alignment of the liquid crystal molecules in the liquid crystal layer 3, thereby modulating the light passing through the liquid crystal layer 3 between the substrate 1 (with TFT array) and the opposing substrate 2. The thus modulated light develops images.

The TFT array is driven by the driver circuit 13 and control circuit 14 through the TAB tape 12 led outside.

There are shown in FIG. 1 a spacer 15, a sealing material 16, a protecting film 17, a diffuser 18, a prism sheet 19, a light guide plate 20, a reflector 21, a back light 22, a supporting frame 23, and a printed circuit board 24. They will be explained later.

Figure 2:
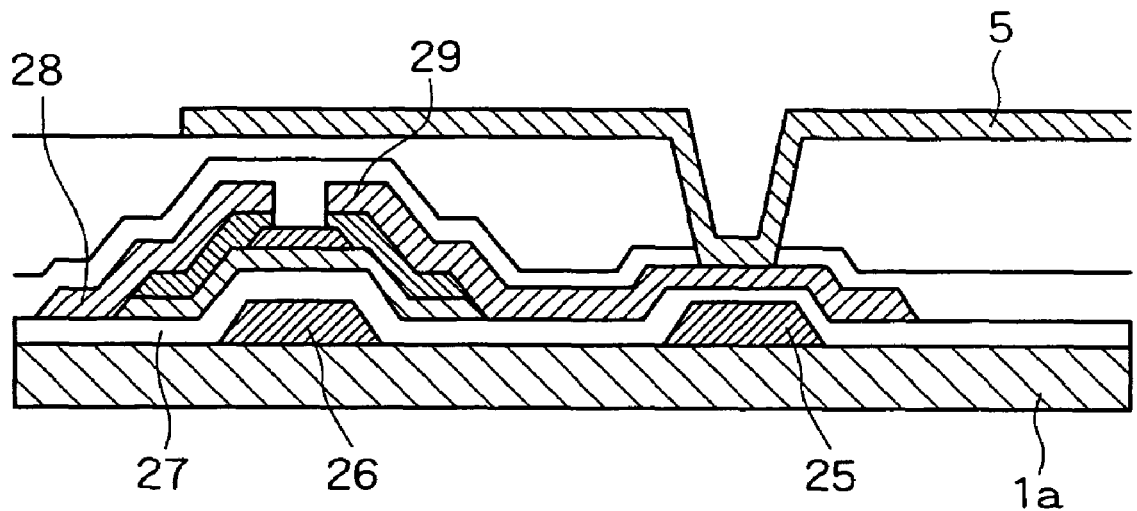
FIG. 2 is a schematic enlarged sectional view illustrating the structure of the thin-film transistor formed on the substrate (according to the first embodiment of the present invention).

FIG. 2 is a schematic enlarged sectional view illustrating the structure of the thin-film transistor formed on the substrate 1 (according to the first embodiment of the present invention). As shown in FIG. 2, on the glass substrate 1a is formed scanning lines 25 of aluminum alloy film. A portion of the scanning lines 25 functions as the gate electrode 26 to control (or turn on and off) the thin film transistors. Signal lines of aluminum alloy film are formed such that they intersect the scanning lines 25, with the gate insulating film 27 interposed between them. A portion of the signal lines functions as the source electrode 28 of the thin film transistor. This structure is usually referred to as bottom gate type.

On the gate insulating film 27 is the pixel region, in which is arranged the transparent conductive film 5 formed from ITO (which is $In_2O_3$ doped with SnO). The drain electrode 29 of the thin film transistor is formed from aluminum alloy film, and it is electrically connected (through direct contact) to the transparent conductive film 5.

The gate electrode 26 of the thin film transistor is supplied with gate voltage through the scanning line 25, so that the thin film transistor is turned on. In this state, the drive voltage, which has previously been supplied to the signal line, is supplied to the transparent conductive film 5 through the drain electrode 29. When the transparent conductive film 5 is supplied with the drive voltage at a prescribed level, a potential difference occurs between the opposing electrodes 2, as explained above with reference to FIG. 1. This potential difference orients the liquid crystal molecules in the liquid crystal layer 3, thereby bringing about light modulation.

The substrate 1 (with TFT array) shown in FIG. 2, which accords with the first embodiment, is produced in the following manner briefly described with reference to FIGS. 3 to 10. Incidentally, the thin film transistor as the switching device is an amorphous silicon TFT in which the semiconductor layer is formed from hydrogenated amorphous silicon.

Figure 3:
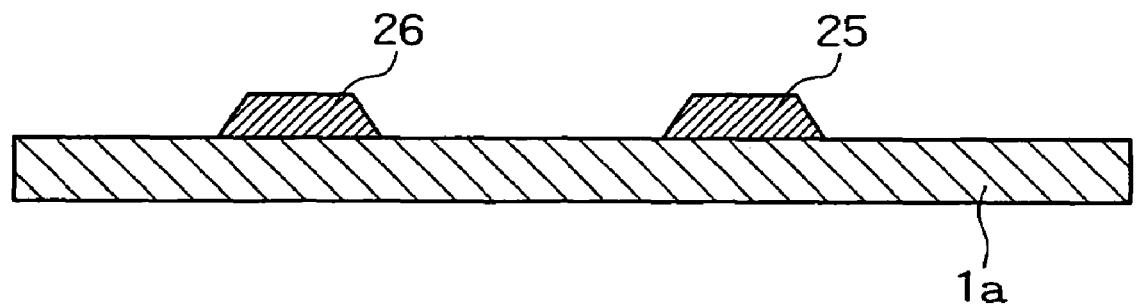
FIG. 3 is a diagram illustrating a step of producing the array of transistors on the substrate shown in FIG. 2.
Figure 4:
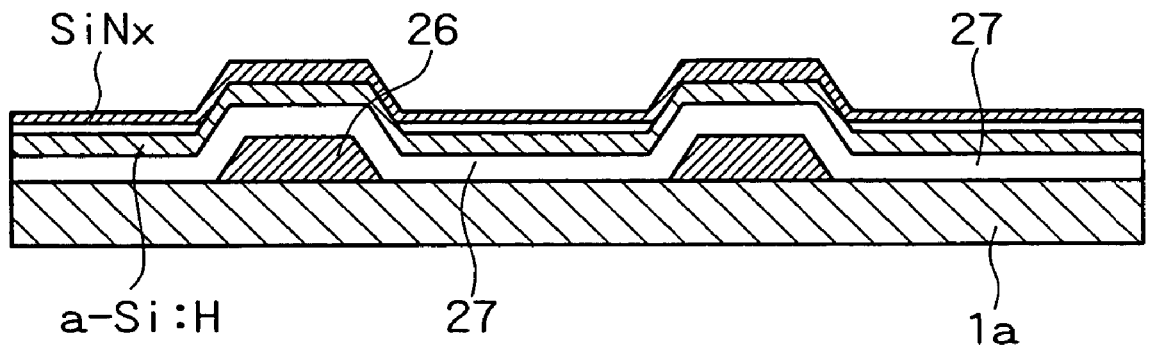
FIG. 4 is a diagram illustrating a step of producing the array of transistors on the substrate shown in FIG. 2.

First, the glass substrate 1a is coated with an aluminum alloy thin film (about 200 nm thick) by sputtering. The aluminum alloy thin film is patterned (by etching) to form the gate electrode 26 and the scanning line 25, as shown in FIG. 3. Etching should be carried out so that the gate electrode 26 and the scanning line 25 have their edges tapered at an angle of 45 to 60 degrees. (This facilitates the coverage of the gate insulating film 27 as mentioned below.) The gate insulating film 27 (about 300 nm thick) is formed from silicon oxide ($SiO_x$) by plasma CVD. On the gate insulating film 27 are formed the hydrogenated amorphous silicon film (a-Si:H) (about 50 nm thick) and the silicon nitride film ($SiN_x$) (about 300 nm thick).

Figure 5:
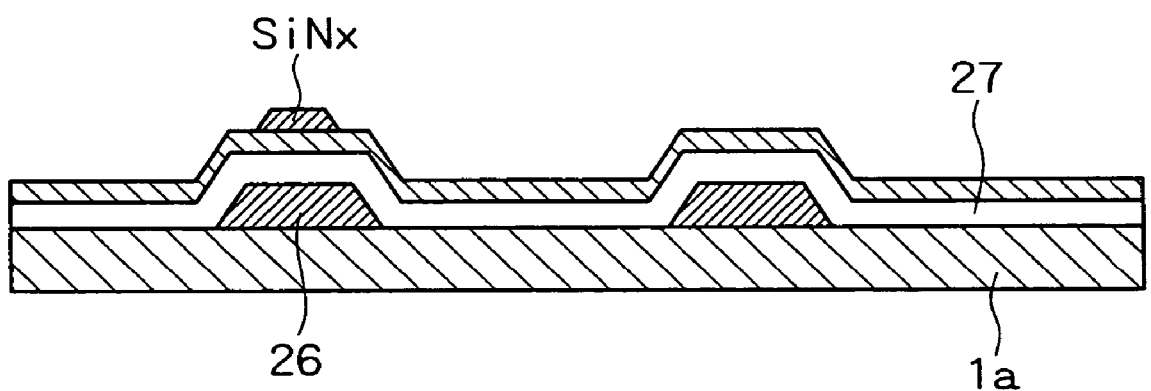
FIG. 5 is a diagram illustrating a step of producing the array of transistors on the substrate shown in FIG. 2.
Figure 6:
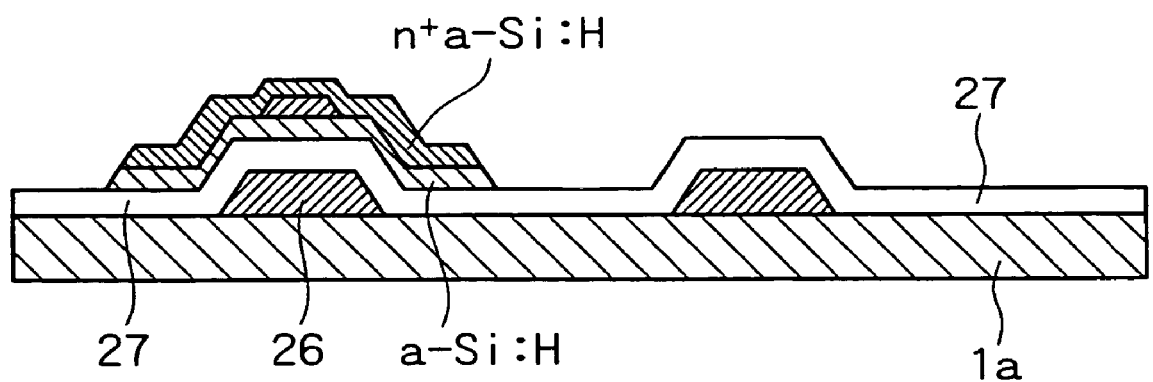
FIG. 6 is a diagram illustrating a step of producing the array of transistors on the substrate shown in FIG. 2.

Next, the silicon nitride film ($SiN_x$) is patterned by back exposure through the gate electrode 26 as the mask, as shown in FIG. 5. The silicon nitride film remaining after patterning becomes the channel protecting film. On the channel protecting film is formed the $n^+$-type hydrogenated amorphous silicon film ($n^+$a-Si:H) (about 50 nm thick) which is doped with phosphorus. Patterning is performed on both the hydrogenated amorphous silicon film (a-Si:H) and the $n^+$-type hydrogenated amorphous silicon film ($n^+$a-Si:H), as shown in FIG. 6.

Figure 7:
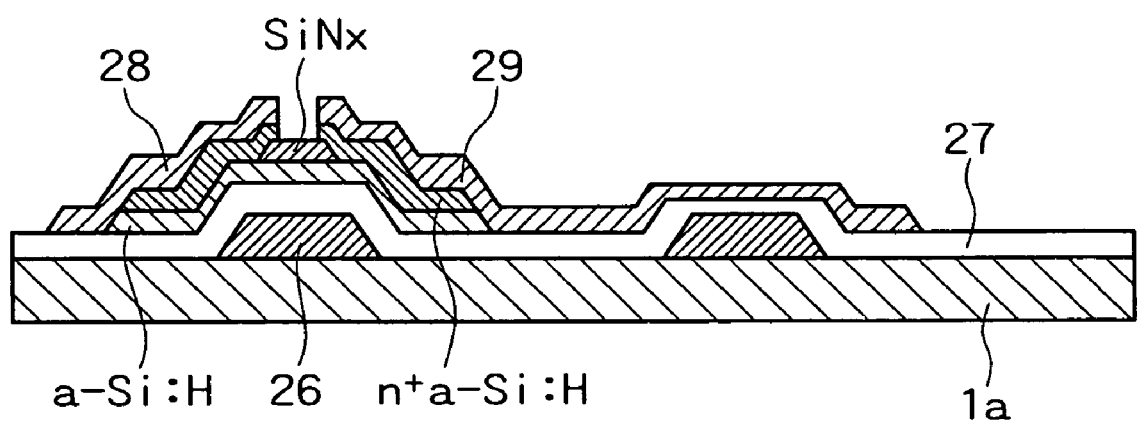
FIG. 7 is a diagram illustrating a step of producing the array of transistors on the substrate shown in FIG. 2.

On the top of the patterned film is formed an aluminum alloy film (about 300 nm thick), which is subsequently patterned as shown in FIG. 7. In this way the source electrode 28 (integral with the signal line) and the drain electrode 29 are formed. (The drain electrode 29 is to come into contact with the transparent conducive film 5 later.) The $n^+$-type hydrogenated amorphous silicon film ($n^+$a-Si:H), which is on the channel protecting film ($SiN_x$), is removed by etching through the source electrode 28 and the drain electrode 29 as the mask.

Figure 8:
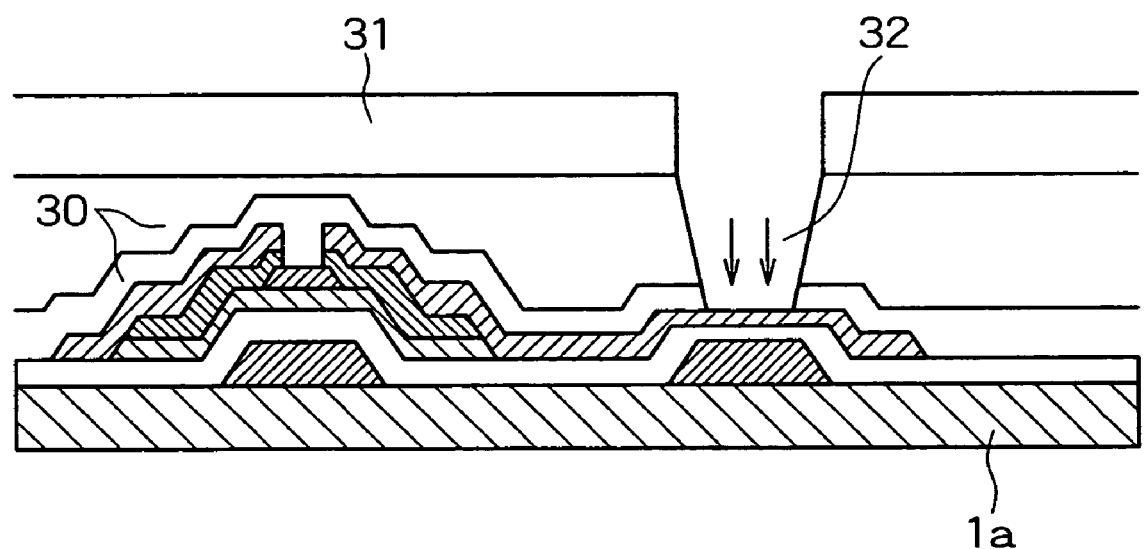
FIG. 8 is a diagram illustrating a step of producing the array of transistors on the substrate shown in FIG. 2.

The silicon nitride film 30 (about 30 nm thick) is formed by plasma CVD at about 260° C., as shown in FIG. 8. It functions as a protective film. On this silicon nitride film 30 is formed the photoresist layer 31, and patterning by dry etching is performed on the silicon nitride film 30 through the photoresist layer 31, so that the contact hole 32 is formed. Simultaneously with this step, another contact hole (not shown) is formed at that part of contact with the TAB on the gate electrode at the panel edge.

Figure 9:
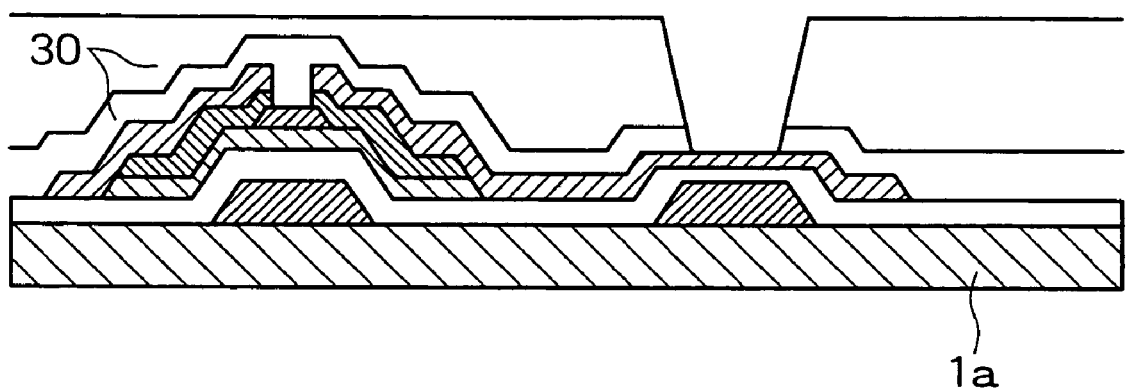
FIG. 9 is a diagram illustrating a step of producing the array of transistors on the substrate shown in FIG. 2.
Figure 10:
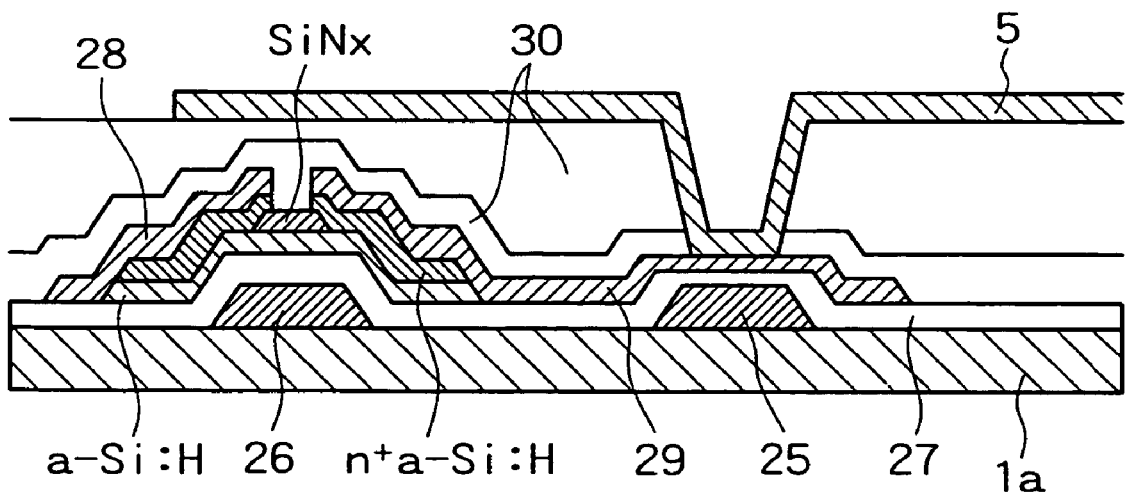
FIG. 10 is a diagram illustrating a step of producing the array of transistors on the substrate shown in FIG. 2.

The photoresist layer 31 is removed by ashing with oxygen plasma and subsequent cleaning with an amine solution, as shown in FIG. 9. Within 8 hours of standing, the ITO film (about 40 nm thick) is formed, and it is patterned to form the transparent conductive film 5, as shown in FIG. 10. At the same time, the ITO film is patterned for bonding with the TAB of the gate electrode at the panel edge. In this way the substrate (with TFT array) is completed.

According to the present invention, the ITO film constituting the transparent conductive film 5 is formed by sputtering on the aluminum alloy film constituting the drain electrode 29 etc. in such a way that a conductive oxide film is formed in the interface between the aluminum alloy film and the transparent conductive film 5. For this purpose, it is desirable to form the ITO film in two or more stages in the following manner. With the substrate kept at 100-200° C., the ITO film (5 to 20 nm thick, preferably about 10 nm thick) constituting the transparent conductive film 5 is formed by sputtering in a non-oxidizing gas atmosphere (such as oxygen-free argon), so that the surface of the aluminum alloy film is not oxidized. The resulting ITO film (with a low oxygen content) has a low conductivity; however, if the substrate is heated at an adequate temperature during the process, the ITO film increases in crystallinity to compensate for decrease in conductivity.

With the substrate kept at the above-mentioned temperature, the film-forming process is continued in an oxygen-containing gas until the film thickness reaches about 20 to 200 nm (preferably about 40 nm). The oxygen-containing gas should preferably be composed of argon at 1 to 5 mTorr (preferably about 3 mTorr) and oxygen at 10 to 50 µTorr (preferably about 20 µTorr). It was confirmed that the ITO film formed under this condition has the lowest electrical resistance (about $1 \times 10^{-4}$ Ω·cm or less). The same effect as above is also produced even when oxygen is replaced by hydrogen. The process for forming the ITO film by sputtering is carried out in two stages (or multiple stages), with the oxygen content varied in the atmosphere gas. In this way it is possible to form the ITO film having a sufficiently high conductivity while preventing the aluminum alloy film from oxidation in the initial stage of ITO film formation.

Incidentally, the ITO film formed at a low temperature is amorphous, but the one formed at a high temperature is polycrystalline and has a high conductivity. Moreover, the later film-forming stage in an oxygen-containing atmosphere gas contributes to high conductivity.

Figure 12:
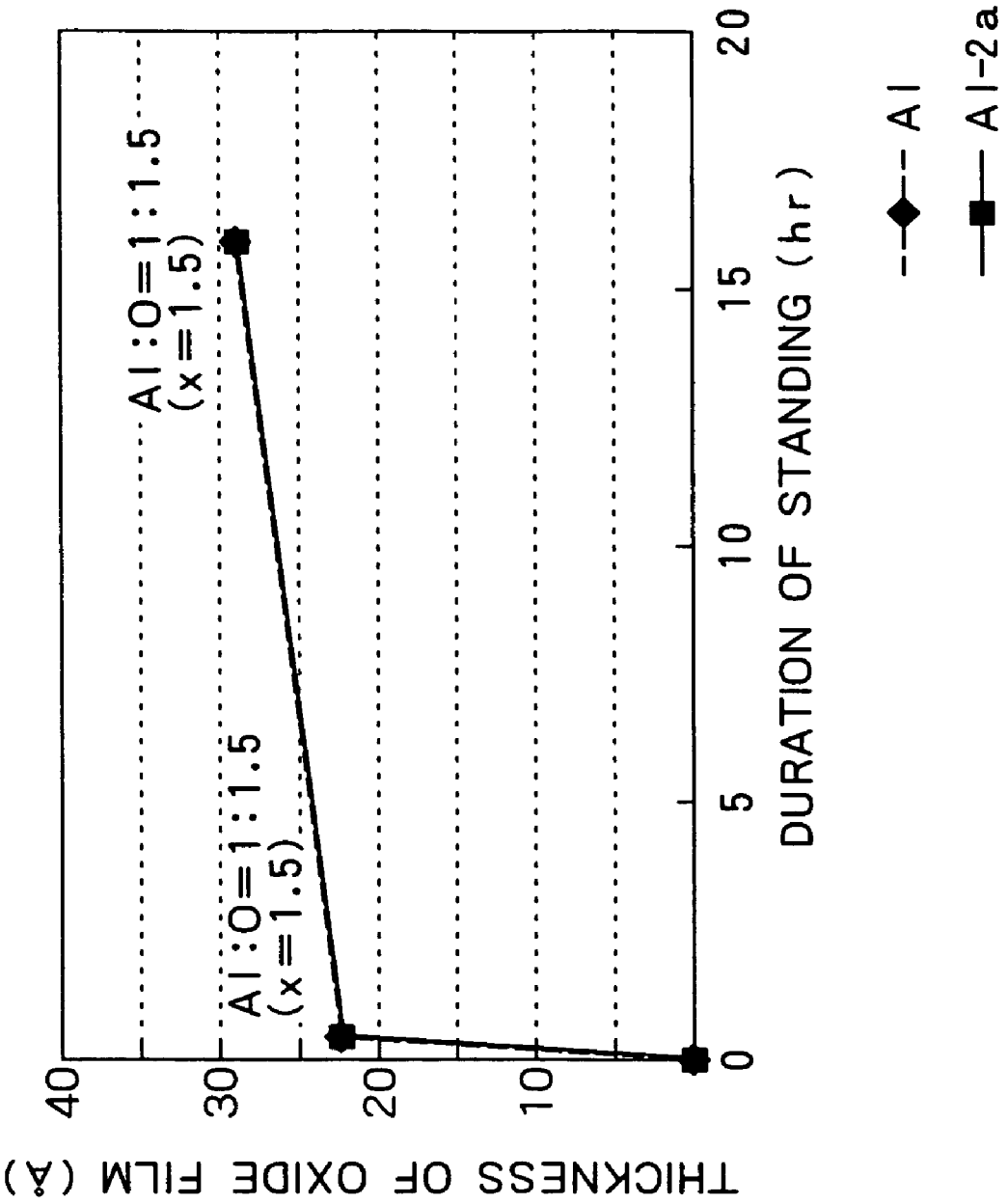
FIG. 12 is a graph showing how the oxide film on pure aluminum or aluminum alloy containing 2 atom % of Ni varies in thickness during storage in the atmosphere.

In the meantime, the present inventors have found that Al—Ni alloy and pure aluminum are not very different in the oxygen content and thickness of the oxide film formed by natural oxidation (as shown in FIG. 12). Nevertheless, there occurs difference between them after the ITO film has been formed on them. This suggests that the final state of oxidation of the oxide film on the aluminum alloy film is determined when the ITO film (constituting the transparent conductive film) is formed. Moreover, it seems that the morphology of oxide film varies depending on the alloying element (such as Ni) added to aluminum. Therefore, if the alloying element is adequately selected and the ITO film is formed under adequate conditions so that the oxide layer has an adequate oxygen content and an adequate thickness, then it will be possible to realize a low, stable contact resistance.

Incidentally, it was found that when the ITO film is formed under the above-mentioned condition, the contact resistance between the ITO film and the Al—Ni alloy film (containing 2 atom % Ni) is 2 to 17 Ω, whereas the contact resistance is higher than 750 Ω when the ITO film is formed in one stage without the substrate being heated (in other words, an oxygen-containing atmosphere gas is employed from the beginning to form the ITO film). This suggests that the two-stage film-forming process mentioned above is extremely effective in lowering the contact resistance.

The above-mentioned effect may also be produced by using any other alloying elements than Ni, such as Au, Ag, Zn, Cu, Sr, Sm, Ge, and Bi. More than one species of them may be used, in combination with the above-mentioned two-stage process, to significantly lower the contact resistance.

Incidentally, the invention disclosed in Japanese Patent Application No. 2002-368786 (filed by the present inventors) yields, unlike the present invention, the aluminum alloy oxide film in the contact interface which has a high oxygen content (equivalent to a stoichiometric amount of oxygen in $Al_2O_3$) and hence has a high contact resistance because the oxygen content in it is not positively controlled. The former process, therefore, required an additional step of performing overetching on the oxide film, removing the oxide film by means of a peeling solution, or causing a metal compound to separate out in the interface in contact with the ITO film, in order to reduce the contact resistance at the interface. However, the present invention does not need such steps because it is designed to reduce contact resistance by controlling the oxygen content in the oxide film present at the interface.

The reduction of contact resistance which is achieved by employing an oxygen-containing atmosphere in the initial stage is enhanced if the substrate is heated while the ITO film is being formed. In fact, the contact resistance is reduced from 750 Ω (without substrate heating) to 250 Ω (with substrate heating). Although the ITO film decreases in contact resistance by about 3 to 33 Ω if it is formed in an oxygen-free atmosphere without the substrate heating, it in itself has a high resistivity of about $8 \times 10^{-4}$ Ω·cm.

The present invention employs the two-stage film-forming process as mentioned above so as to reduce the contact resistance of the interface between the aluminum alloy film and the ITO film formed thereon and to keep low the resistivity of the ITO film itself. There is a conceivable method for improving the conductivity of the ITO film by incorporating the atmosphere gas with steam or hydrogen in place of oxygen. Steam works as an oxidizing gas under the specific heating condition, thereby effectively oxidizes the aluminum alloy film like oxygen.

As mentioned above, the present invention specifies the species of alloying element in the aluminum alloy film and controls the film forming conditions for the ITO film to be formed on the aluminum alloy film in order to improve the characteristic properties of the oxide film (at the contact interface) and the ITO film. This permits direct contact without the necessity of removing oxide film from the contact interface.

As will be detailed later, the present invention requires that the aluminum alloy oxide film at the contact interface should contain oxygen in an amount no more than 44 atom %, preferably no more than 42 atom %, and have a thickness in the range of 1 to 10 nm, preferably 2 to 8 nm, particularly in the neighborhood of 5 nm. The thus specified oxygen content and thickness minimize the contact resistance. For this reason, the present invention places importance on the proper selection of the alloying elements constituting the aluminum alloy film and the control of the ITO film forming conditions.

The substrate (with TFT array) prepared in the foregoing manner has thereon the drain electrode 29 and the transparent conductive film 5 which are in direct contact with each other and also has thereon the gate electrode 26 and the ITO film (for TAB connection) which are in direct contact with each other.

Contact resistance between the transparent conductive film 5 and the aluminum alloy film constituting the drain electrode 29 can be significantly reduced by adequately controlling the condition under which the drain electrode 29 is formed, if the aluminum alloy film constituting the drain electrode 29 is formed from an Al—Ni alloy (mentioned above) or any other aluminum alloys containing 0.1 to 6 atom % of one or more than one alloy element selected from Au, Ag, Zn, cu, Sr, Sm, Ge, and Bi.

Incidentally, the reduction of contact resistance intended by the present invention is not achieved if the content of alloying element in the aluminum alloy film is less than 0.1 atom %, in which case the oxygen content is not sufficiently low in the oxide layer formed in the interface in contact with the transparent conductive film 5. Conversely, if the amount of alloying element is more than 6 atom %, the aluminum alloy film in itself increases in resistance, which decreases the response speed of pixels, resulting in an increased power consumption and a deteriorated display quality. An adequate content of alloying element for a trade-off should be no less than 0.1 atom %, preferably no less than 0.2 atom %, and no more than 6 atom %, preferably no more than 5 atom %.

According to the present invention, the alloying element may also be selected from Nd, Y, Fe, Co, Ti, Ta, Cr, Zr, and Hf in addition to the above-mentioned alloying elements. These alloying elements should be used in an amount of 0.1 to 6 atom %, preferably 0.2 to 2 atom %, so that they prevent hillocks and voids, thereby increasing heat resistance (up to 300° C. or above), mechanical strength, and corrosion resistance. Of these alloying elements, Nd, Y, Fe, and Co are particularly desirable. They sufficiently decrease the resistivity of the aluminum alloy wiring as the result of heat treatment at 300° C.

The present invention may be embodied in another way to further reduce contact resistance between the aluminum alloy film and the transparent conductive film 5. According to this embodiment, the object of reducing contact resistance is effectively achieved by forming a Ni-concentrated layer in that side of the Ni-containing aluminum alloy film which is adjacent to the transparent conductive film 5. The thickness of the Ni-concentrated layer should be no smaller than 0.5 nm, preferably no smaller than 1.0 nm, and no larger than 10 nm, preferably no larger than 5 nm. The nickel concentration in the Ni-concentrated layer should be more than twice, preferably more than 2.5 times, the average nickel concentration in the aluminum alloy film. In the case where the aluminum alloy film contains any other alloying element than Ni (such as Au, Ag, Zn, Cu, Sr, Sm, and Bi), the Ni-concentrated layer may be replaced by a layer containing such an alloying element in a high concentration as mentioned above.

The aluminum alloy film containing Ni as an alloying element causes, upon heat treatment, Ni to separate out on the grain boundary of the aluminum alloy if the amount of Ni exceeds the limit of solubility (0.1%) in the aluminum alloy. Part of the nickel which has separated out diffuses and condenses in the surface of the aluminum alloy film, thereby forming the Ni-concentrated layer therein. In addition, nickel halides (which have a lower vapor pressure and hence less volatile than aluminum) remain on the surface of the aluminum alloy film at the time of etching to make contact holes. Consequently, the concentration of Ni in the surface layer of the aluminum alloy film becomes higher than that in the aluminum alloy in bulk form. Thus it is also possible to control the concentration of Ni in the surface layer and to control the thickness of the Ni-concentrated layer by performing etching under adequate conditions.

The substrate (with TFT array) prepared as mentioned above offers its advantage when used for display devices such as liquid crystal display devices. The advantage is that contact resistance is minimized between the transparent conductive film and the connecting wiring part. This leads to improved display quality.

Meanwhile, when wiring of pure aluminum or Al—Nd alloy is brought into direct contact with the transparent conductive film according to the conventional process, an aluminum oxide film with a high resistance is formed (or non-ohmic contact is formed) on the contact interface. It is known from observation of cross-section with TEM and analysis of composition by EDX that the oxygen content in the aluminum oxide film formed on the contact interface is approximately identical with that of aluminum oxide ($Al_2O_3$) having the stoichiometric composition. In other words, the oxygen content in the aluminum oxide layer is 60 atom % (Al: O=1:1.5) and the thickness of the aluminum oxide layer is about 6.5 to 7 nm. The contact resistance through an 80 μm square contact hole was about 150 kΩ. This suggests that the aluminum oxide film as thin as 6.5 to 7 nm functions as a high-resistance insulating film in view of the fact that $Al_2O_3$ with a stoichiometric composition is an insulator with a resistivity of about $10^{14}$ Ω·cm.

That the present invention differs from the above-mentioned conventional technology was concluded from the fact that the aluminum alloy oxide film containing 40.2 atom % of oxygen (Al: O=1:0.67) and having a thickness of 4 to 4.5 nm gives a contact resistance of 12 Ω. In other words, an aluminum alloy oxide layer which is rich in aluminum and has a low oxygen content exhibits the properties of n-type semiconductor and hence exhibits the electrical conductivity similar to that of metallic aluminum. Variation of film thickness (about several nanometers) does not greatly affect the contact resistance, but a smaller thickness is favorable to contact resistance; therefore, the thickness of the aluminum alloy oxide film should preferably be smaller than about 10 nm.

Figure 11:
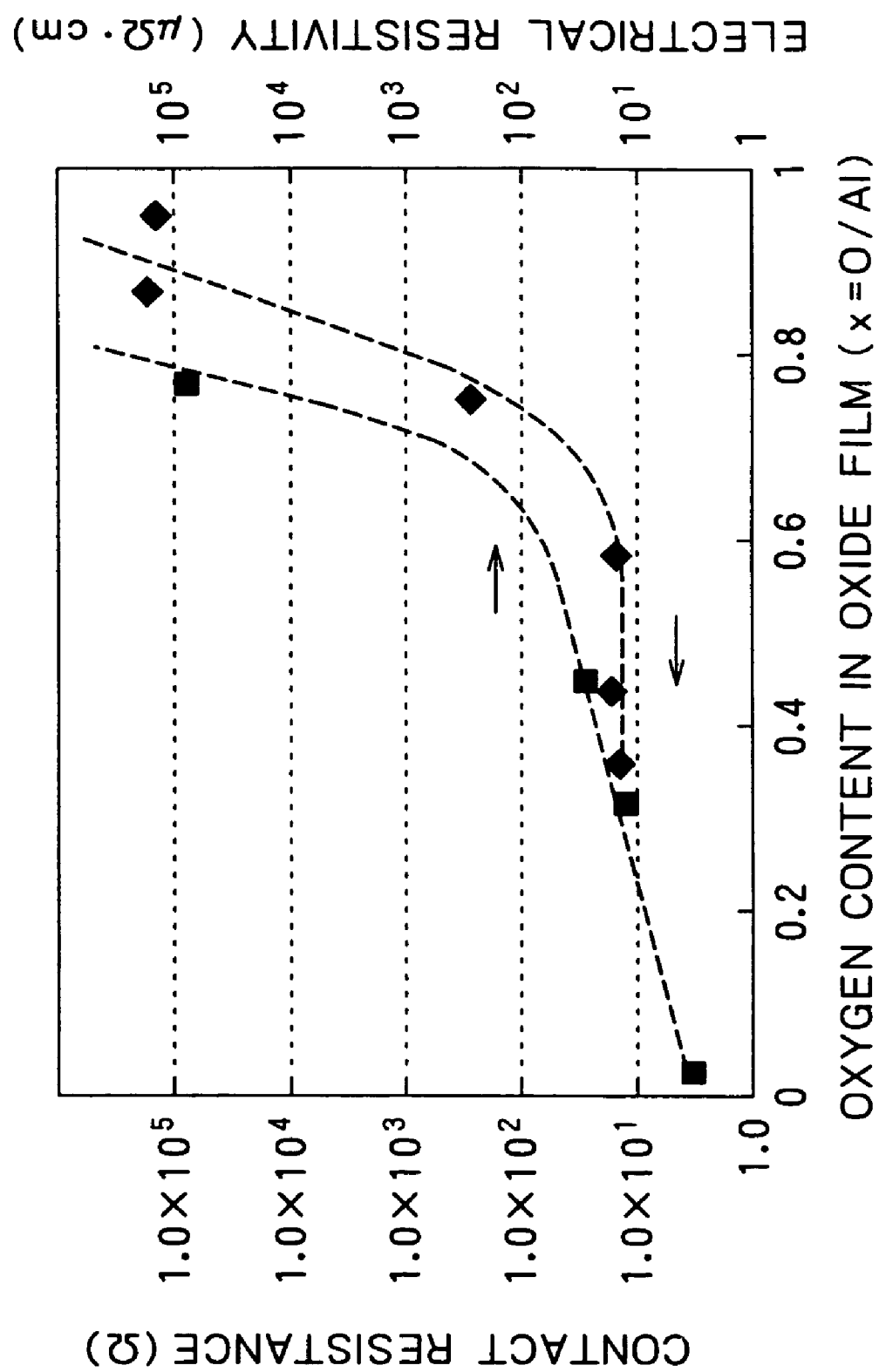
FIG. 11 is a graph in which the contact resistance and electric resistivity are plotted against the oxygen content in the oxide film which is formed in the interface between the aluminum alloy film and the transparent conductive film of ITO.

FIG. 11 is a graph showing how the oxygen content in the aluminum alloy oxide film relates to the electric resistivity and contact resistance. It is apparent from FIG. 11 that as the oxygen content in the aluminum alloy oxide film exceeds 40 atom % (O/Al=0.67), both the contact resistance and the electric resistivity steeply increase. That is, 44 atom % (O/Al=0.79) for 200 Ω and 49 atom % (O/Al=0.96) for 150 kΩ. At 56 atom % and above (O/Al=1.27), ohmic contact changes into non-ohmic contact. With a contact resistance higher than 200 Ω, the display device will be poor in quality and yield; therefore, the oxygen content should preferably be lower than 44 atom %.

Incidentally, the surface of the aluminum alloy film is subject to spontaneous oxidation during standing in the atmosphere, and oxidation advances further while the ITO film is being formed, thereby making a thick oxide film. The rate at which an aluminum oxide film grows due to spontaneous oxidation was measured by XPS (X-ray photoelectron spectroscopy). The result is shown in FIG. 12. It is noted that there is no substantial difference between pure aluminum and aluminum alloy containing 2 atom % of Ni (which is capable of direct contact). In other words, both of pure aluminum and aluminum alloy give an oxide film (3 nm thick) after standing in the atmosphere for 16 hours, and the oxide film contains about 60 atom % of oxygen, which is equivalent to the stoichiometric amount (Al: O=1:1.5).

In order to investigate the factor that affects the oxygen content, an ITO film was formed on the surface of an aluminum alloy film (containing 2 atom % of Ni) in the same way as mentioned above (the two-stage method according to the present invention), and the cross section of the contact part was observed under a TEM. It was found that the thickness of the oxide film is 4 to 4.5 nm, which is 4/3 to 4.5/3 times (or 1.3 to 1.5 times) thicker than that of the naturally formed oxide film, and that the oxygen content in the oxide film is 40.2 atom %. Since the volume of the oxide film was increased by 1.3 to 1.5 times, without oxygen being absorbed, after the ITO film had been formed, the foregoing result suggests that the oxygen content before ITO film formation was decreased from about 60 atom % to about 40 atom % (equal to 60 atom % divided by 1.5).

It is concluded from the foregoing experiment that in order to decrease the oxygen content in the aluminum alloy oxide film, it is important to prevent oxidation of aluminum that occurs while the ITO film is being formed. To achieve this objective, it is necessary to form the ITO film in an oxygen-free non-oxidizing atmosphere at least in the early stage. The resulting oxide film is considered to have a resistivity of about 200 $\mu\Omega \cdot cm$ and a contact resistance of about 12 $\Omega$, judging from FIG. 11. It is apparent that controlling the amount of oxygen absorbed during ITO film formation is effective in reducing the contact resistance.

A description is given below of the fact that impurities contained in aluminum alloy oxide film effectively improve conductivity.

It is known well that $\beta$-$Al_2O_3$ becomes an ion-conductive material (having a conductivity of about $10^2$ $\Omega \cdot cm$) upon incorporation with an alkali metal, such as sodium and potassium, as an impurity. This phenomenon is attributable to the fact that alkali metal ions are much smaller than crystal lattices of $Al_2O_3$ and hence are capable of free movement among them. However, upon entrance into a semi-conductor material such as TFT, alkali metal ions cause a trouble as they move in TFT.

Another conceivable way to increase conductivity is to incorporate the aluminum oxide film with nickel which is less detrimental than alkali metal to semiconductor elements. A sample of ITO film in direct contact with an aluminum alloy film containing 2 atom % of nickel was prepared and analyzed by EDX using a TEM cross-section sample. It was found that the content of Ni in the Ni-concentrated layer is 4 to 8 atom %, whereas that in the aluminum oxide layer is at least 2 atom %.

Figure 13:
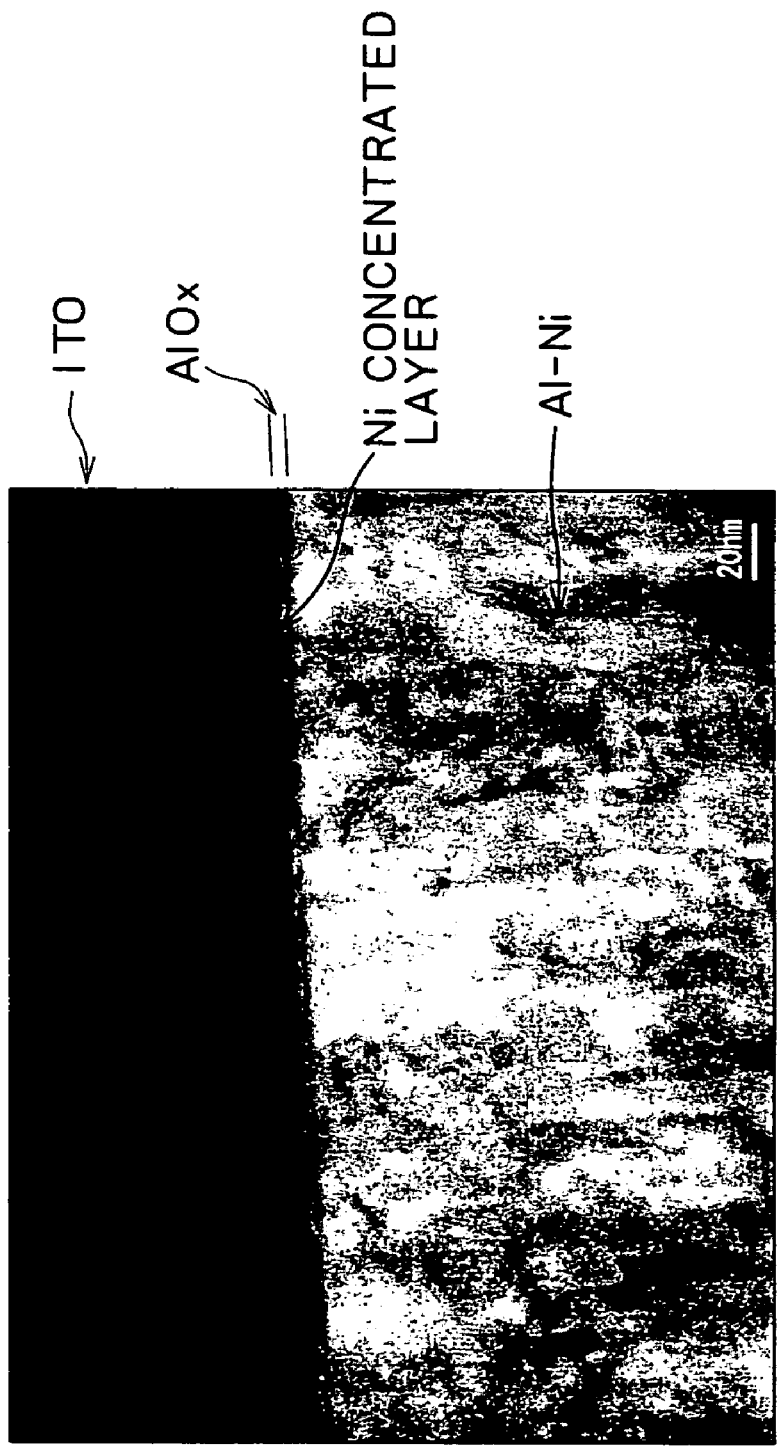
FIG. 13 is a TEM photograph showing the oxide layer and the Ni-concentrated layer which are formed in the interface of direct contact between the transparent conductive film of ITO and the aluminum alloy containing 2 atom % of Ni.

When an ITO film is formed on an Al—Ni alloy film, an aluminum oxide ($AlO_x$) layer and a Ni-concentrated layer (about 1 nm thick) occur in the interface between the two films, as shown in FIG. 13 which is a TEM micrograph showing an aluminum oxide layer and Ni-concentrated layer that occur in the interface of direct contact between ITO film and Al—Ni alloy film. This suggests that aluminum diffuses toward the oxide film and Ni diffuses toward the Al—Ni alloy film and that Ni remains more than Al during dry etching to make contact holes. Once the Ni-concentrated layer occurs, it prevents diffusion of aluminum from the aluminum alloy film, thereby preventing aluminum oxidation.

Figure 14:
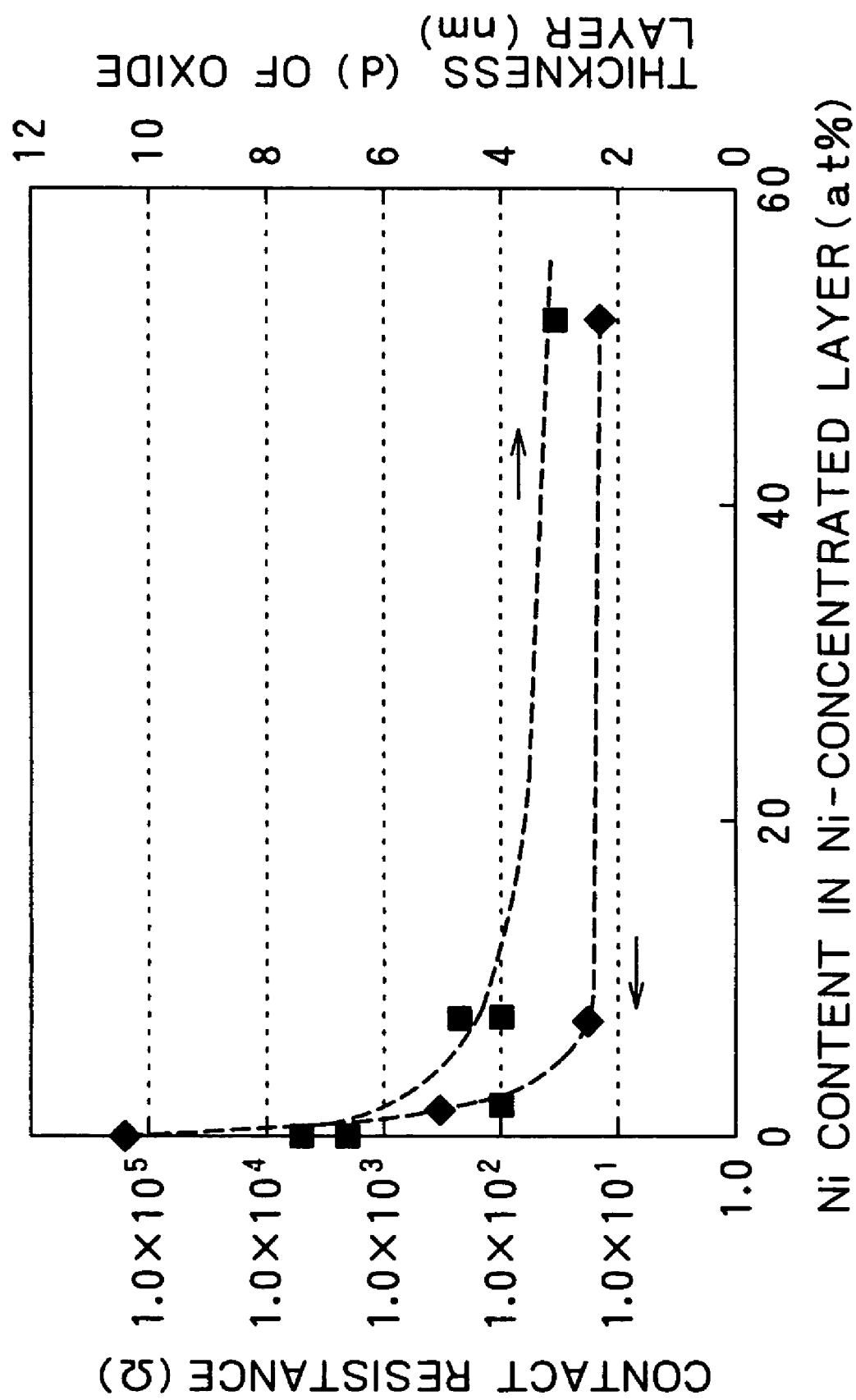
FIG. 14 is a graph showing how the contact resistance and the thickness of the oxide film vary depending on the Ni content in the Ni-concentrated layer.
Figure 15:
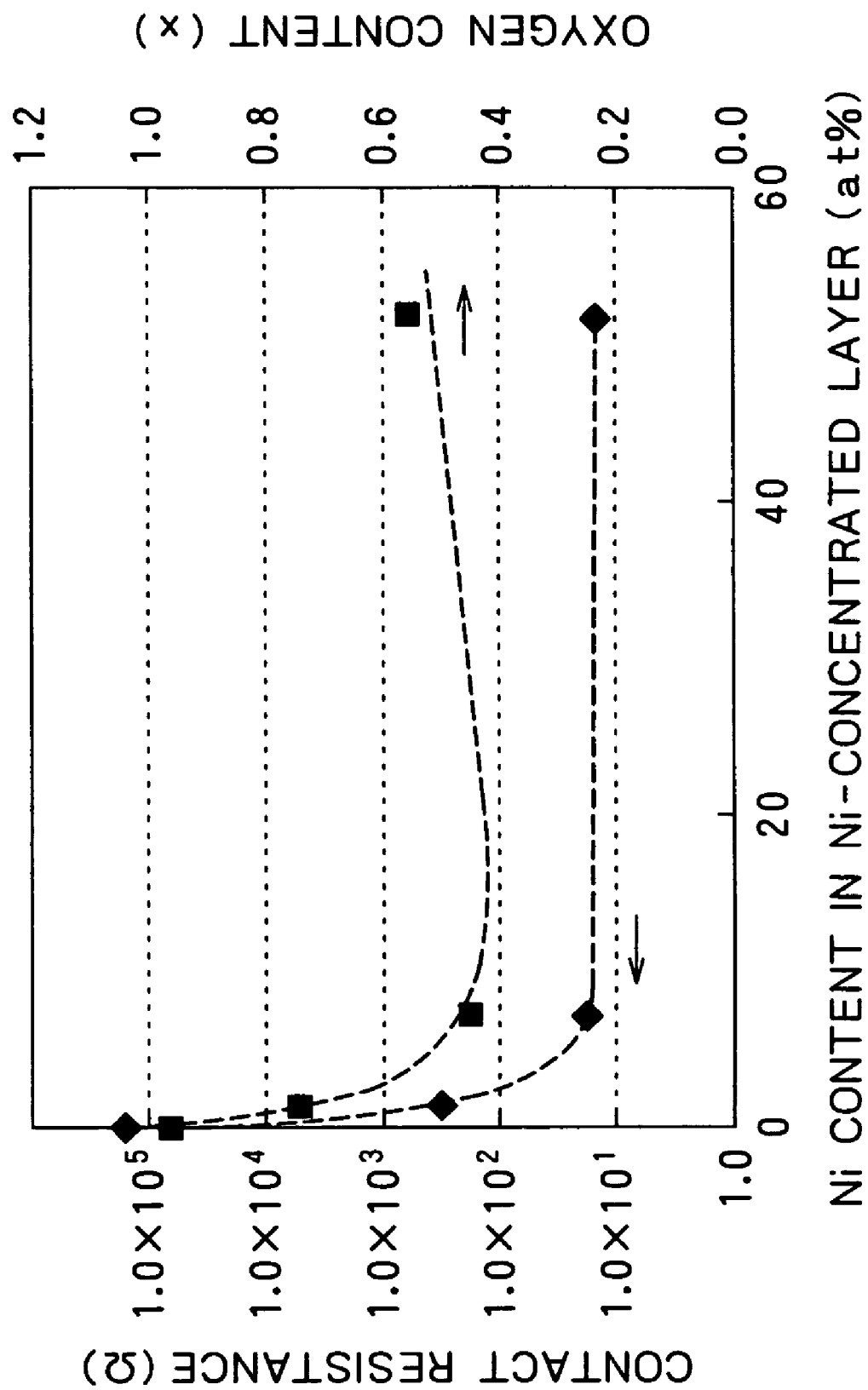
FIG. 15 is a graph showing how the contact resistance and the oxygen content vary depending on the Ni content in the Ni-concentrated layer.

FIG. 14 is a graph showing how the thickness (nm) of the oxide film and the contact resistance ($\Omega$) vary depending on the Ni content in the Ni-concentrated layer. It is apparent from FIG. 14 that as the Ni content in the Ni-concentrated layer increases, the thickness of the aluminum oxide layer (which is observed after the ITO film has been formed) decreases. At the same time, the oxygen content decreases and the contact resistance also decreases, as shown in FIG. 15. This suggests that the Ni-concentrated layer plays an important role.

For the Ni-concentrated layer to produce its effect as mentioned above, it is necessary that the thickness of the Ni-concentrated layer should be in a range of 1 to 10 nm and the Ni content in the Ni-concentrated layer should be more than twice the Ni content in the Al—Ni alloy layer.

Incidentally, in the case where a pure aluminum layer or an Al—Ni alloy layer is formed on an ITO film (opposite to the structure shown in FIG. 2), ohmic contact may occur, with oxidation suppressed in the interface. This is due to the fact that no aluminum oxide film with high resistance occurs in the interface.

Upon oxidation, the Al—Ni alloy forms the Ni-concentrated layer by the following mechanism. Aluminum diffuses through aluminum oxide, reaching the surface where it combines with oxygen to sustain oxidation. By contrast, Ni with low solubility in aluminum oxide diffuses into the bulk of aluminum alloy to form the Ni-concentrated layer. The Ni-concentrated layer with a controlled Ni content may also be formed by heating or dry etching (which is performed on the aluminum surface in such a way that nickel remains on the surface). Heating at 150 to 300° C. for 1 hour increases the Ni content from 3.1 atom % to 5.1 atom %, and dry etching increases the Ni content to 10.2 atom %. These results were confirmed by Auger electron spectroscopy to determine the depth profile.

Thus, it is possible to form the Ni-concentrated layer having a desired thickness and a desired Ni content by the above-mentioned methods, which include substrate heating to form the insulating, surface treatment of aluminum wiring with plasma or etching solution (such as acid and alkali), and slight etching on the aluminum surface.

Incidentally, direct contact between an ITO film and a pure aluminum wiring give a contact resistance of $1.5 \times 10^5$ $\Omega$, and direct contact between an ITO film and an Al—Nd alloy wiring (as a typical aluminum alloy) gives a contact resistance of $8.4 \times 10^5$ $\Omega$. Indirect contact (of conventional structure) between and ITO film and an Al—Nd alloy wiring, with a barrier metal (Mo) interposed between them, gives a contact resistance of $1.0 \times 10^1$ $\Omega$. By contrast, contact resistance of Al—Ni alloy wiring is $1.2 \times 10^1$ $\Omega$, contact resistance of Al—Ni—Nd alloy wiring is $1.5 \times 10^1$ $\Omega$. and contact resistance of Al—Ni—Y alloy wiring is $1.3 \times 10^1$ $\Omega$. These values are approximately equal to those of the conventional structure that employs Mo as a barrier metal.

The following is about the results of experiments to examine the device for durability. A sample representing direct contact between ITO and aluminum alloy was kept at 80° C. and 80% RH in a thermostat for 120 hours or 240 hours. The same test as above was performed on a comparative sample prepared by forming an SiN film on aluminum alloy by CVD method, making contact holes by dry etching, and finally forming an ITO film, or a comparative sample prepared by forming an ITO film directly on aluminum alloy wiring, without heat treatment (above 150° C.) or dry etching on the aluminum alloy wiring. It was found that those samples which had undergone heat treatment (above 150° C.) or dry etching remained unchanged in contact resistance before and after the test. This was true for an aluminum alloy containing 2 atom % Ni and 0.6 atom % Nd.

The following is about the results of experiments to test the device for reliability by observing the change in contact resistance that occurs after application of high-density pulse current to the connecting part for a long period of time. The test sample is a contact hole (80 µm square) consisting of aluminum alloy and ITO which are in direct contact with each other. The test consists of continuously applying 5 mA pulse current (with a constant pulse width) to the sample in the direction of aluminum alloy to ITO. The current of 5 mA is a comparatively large value equivalent to 78 A/cm$^2$ in terms of current density through the contact area. The sample of aluminum alloy containing 2 atom % Ni and 0.6 atom % Nd, which had undergone heat treatment or dry etching, retained its initial contact resistance of 15 Ω after it was tested for 14 hours in the same way as above.

It is known from the foregoing that a sample consisting of ITO film and pure aluminum wiring which are in direct contact with each other has a contact resistance of $1.5 \times 10^5$ Ω, whereas a sample consisting of ITO film and aluminum alloy wiring (according to the present invention) which are in direct contact with each other has a much lower contact resistance (about $1/10^4$ of said contact resistance).

The above-mentioned embodiment was applied to a trial product of liquid crystal display device. The trial product was comparable in yields and display quality to the conventional device which has an ITO film combined with a barrier metal (such as Mo). In other words, the present invention obviates the necessity of barrier metal to produce display devices comparable to conventional ones. This helps to simplify manufacturing steps and to reduce production cost. The aluminum alloy film mentioned above may be used for electrodes in place of conventional pure aluminum film, aluminum alloy film, or Mo-W film, to make direct contact with the transparent conductive film. This contributes to simplified manufacturing steps and reduced production cost.

The following is concerned with the display device of passive matrix type to which the substrate (with TFT array) mentioned above is applied.

A display device of passive matrix type has electrode lines running in vertical and horizontal directions, with each line driving pixels. In such a display device, direct contact with a low contact resistance is possible between the aluminum alloy film (for electrode wiring) and the ITO film even in the absence of interlayer insulating film for electrodes (or even in the case where the electrode wiring does not undergo heat treatment that forms intermetallic compound as described in the above-mentioned patent application filed by the present inventors). The process in this case does not involve annealing for aluminum alloy, contact etching, and etching on the surface of the aluminum alloy. However, the above-mentioned embodiment involves heating (which results from CVD to form $SiN_x$) and slight etching on the surface of aluminum alloy (which results from contact etching on $SiN_x$).

By contrast, the present invention permits direct contact even though the aluminum alloy film does not undergo heating and etching. Contact resistance of direct contact between ITO film (constituting the transparent electrode) and aluminum alloy containing 2 atom % Ni is 9 Ω. A probable reason for this is that the alloying element (such as Ni) concentrates at the contact interface by heating and surface etching as well as natural oxidation and Ni further separates out at grain boundaries at least in the outermost surface of aluminum alloy film when the substrate is heated or exposed to plasma to form the ITO film. The separation of Ni is due to the low solubility of Ni (less than 0.1 atom %) in aluminum. Even in this situation, the aluminum alloy oxide layer keeps the same oxygen content but increases in thickness (which results in a decrease in oxygen concentration), and a small amount of Ni enters the oxide film, thereby increasing its conductivity.

Figure 16:
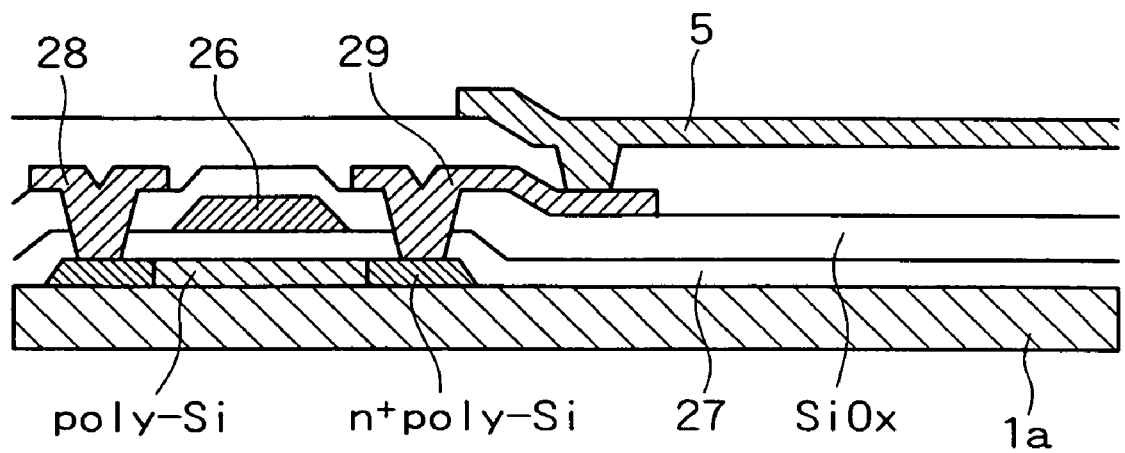
FIG. 16 is a schematic enlarged sectional view illustrating the structure of the thin-film transistor formed on the substrate (according to another embodiment of the present invention).

FIG. 16 is a schematic enlarged sectional view illustrating the structure of the thin-film transistor formed on the substrate (according to another embodiment of the present invention). The thin film transistor in this embodiment is of top-gate type.

As shown in FIG. 16, the thin film transistor, which is formed on the glass substrate 1a, has scanning lines of aluminum alloy thin film. A portion of the scanning lines functions as the gate electrode 26 that controls (turns on and off) the thin film transistor. There are signal lines of aluminum alloy which intersect said scanning lines, with an interlayer insulating film of $SiO_x$ interposed between them. A portion of the signal lines functions as the source electrode 28 of the thin film transistor.

On the pixel region of the interlayer insulating film of $SiO_x$ is placed the transparent conductive film 5 of ITO. (ITO is $In_2O_3$ doped with SnO.) This thin film transistor also has the drain electrode 29 of aluminum alloy, which is electrically connected direct to the transparent conductive film 5.

The thin film transistor works in the same way as explained above with reference to FIG. 2. That is, the thin film transistor is turned on when the gate electrode 26 is supplied with gate voltage through the scanning line, so that the driving voltage (which has previously been supplied to the signal line) is supplied to the transparent conductive film 5 from the source electrode 28 through the drain electrode 29. In this state, a potential difference occurs between the opposing electrodes 10 (as explained above with reference to FIG. 1), thereby causing the liquid crystal molecules to orient (for light modulation) in the liquid crystal layer 3.

The substrate (with TFT array) shown in FIG. 16 is produced in the following manner. Incidentally, the thin film transistors on the substrate are those of top-gate type in which the semiconductor layer is formed from poly-silicon (poly-Si). FIGS. 17 to 23 schematically show the fabricating steps for the substrate (with TFT array) according to the second embodiment of the present invention.

Figure 17:
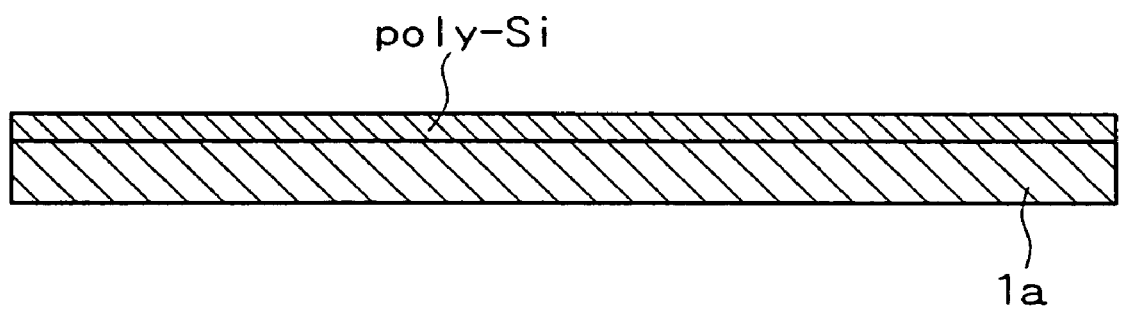
FIG. 17 is a diagram illustrating a step of producing the array of transistors on the substrate shown in FIG. 16.

The first step starts with coating the glass substrate 1a sequentially with silicon nitride film ($SiN_x$) (about 50 nm thick), silicon oxide film ($SiO_x$) (about 100 nm thick), and hydrogenated amorphous silicon film (a-Si:H) (about 50 nm thick) by plasma CVD method, with the substrate heated at about 300° C. Heat treatment and laser annealing are performed to convert the hydrogenated amorphous silicon film (a-Si:H) into polysilicon film. The heat treatment is carried out at about 470° C. for about 1 hour in an atmosphere for dehydrogenation. Then, the hydrogenated amorphous silicon film (a-Si:H) is irradiated with an excimer laser beam (about 230 mJ/cm$^2$) so that it is converted into a polysilicon film (poly-Si) (about 0.3 μm thick), as shown in FIG. 17.

Figure 18:
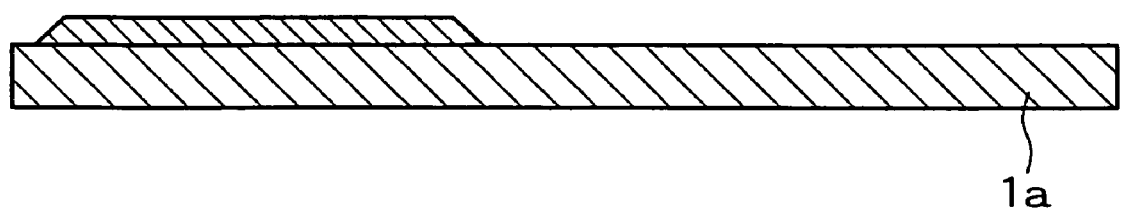
FIG. 18 is a diagram illustrating a step of producing the array of transistors on the substrate shown in FIG. 16.
Figure 19:
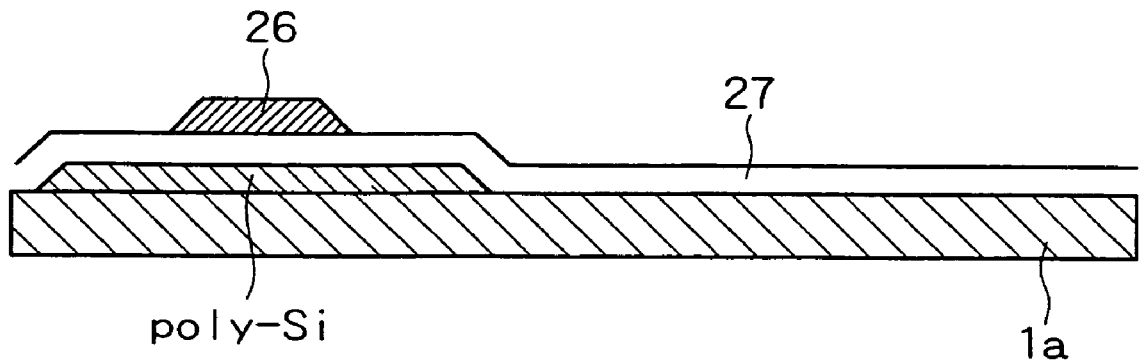
FIG. 19 is a diagram illustrating a step of producing the array of transistors on the substrate shown in FIG. 16.

Subsequently, the polysilicon film (poly-Si) is patterned by plasma etching, as shown in FIG. 18. Then, a silicon oxide film ($SiO_x$) (about 100 nm thick) is formed, as shown in FIG. 19. This silicon oxide film functions as the gate insulating film 27. On the gate insulating film 27 is formed by sputtering an aluminum alloy film (about 200 nm thick), which is subsequently patterned by plasma etching to form the gate electrode 26 integral with the scanning line.

Figure 20:
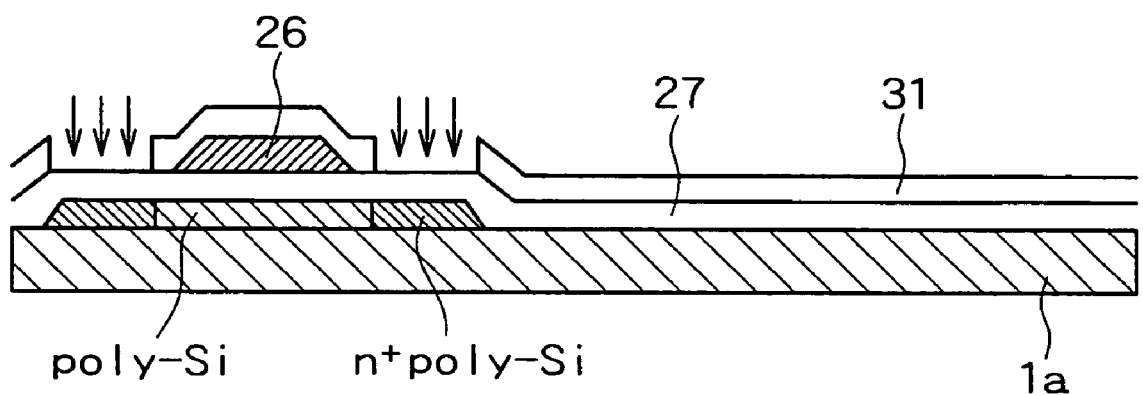
FIG. 20 is a diagram illustrating a step of producing the array of transistors on the substrate shown in FIG. 16.

A mask of photoresist 31 is formed as shown in FIG. 20. Doping with phosphorus (about $1 \times 10^{15}$ atoms/cm$^2$) is performed at about 50 keV by using an ion implantation system, so that an n$^+$-type polysilicon film (n$^+$-poly-Si) is formed in a portion of the polysilicon film (poly-Si). The photo-resist is peeled off and removed. After that, phosphorus is diffused by heat treatment at about 500° C.

Figure 21:
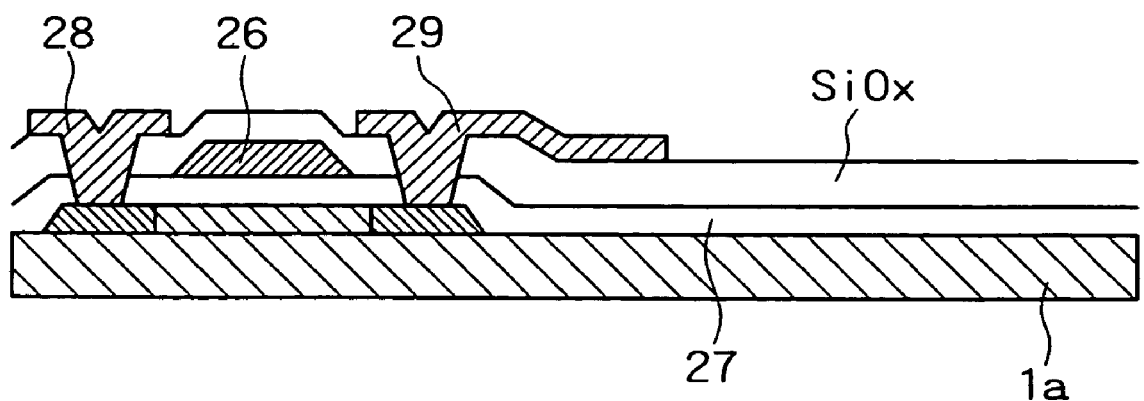
FIG. 21 is a diagram illustrating a step of producing the array of transistors on the substrate shown in FIG. 16.

A silicon oxide film ($SiO_x$) (about 500 nm thick) is formed by using a plasma CVD apparatus, with the substrate kept at about 300° C., as shown in FIG. 21. This silicon oxide film functions as the interlayer insulating film. Dry etching is performed on the interlayer insulating film of silicon oxide and the gate insulating film 27 of silicon oxide through a patterned photoresist (which is formed in the same way as mentioned above), in order to form contact holes. An aluminum alloy film (about 450 nm thick) is formed by sputtering, and then it is patterned to form the source electrode 28 (integral with the signal line) and the drain electrode 29. Thus, the source electrode 28 and the drain electrode 29 are in contact with the n$^+$-polysilicon film through their respective contact holes.

Figure 22:
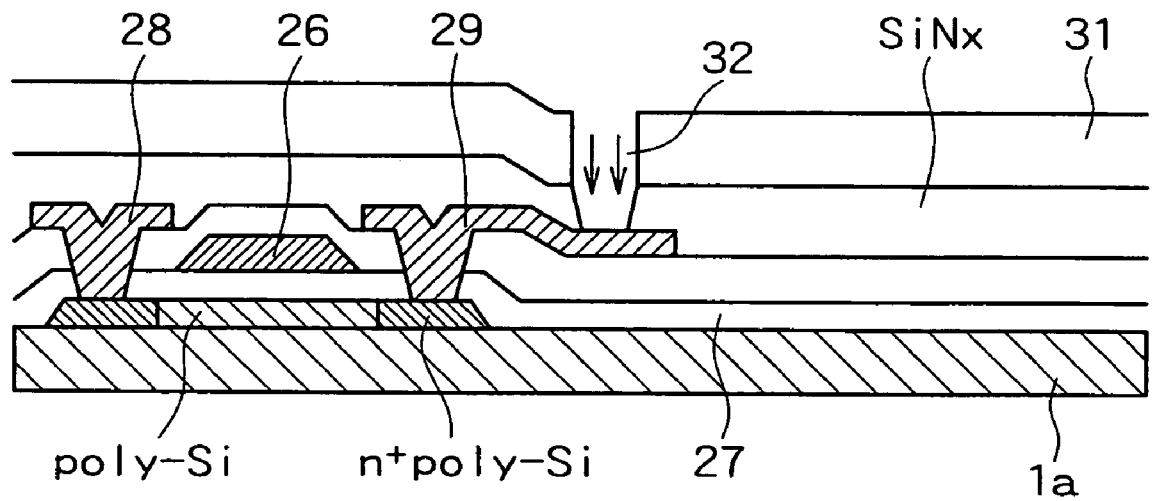
FIG. 22 is a diagram illustrating a step of producing the array of transistors on the substrate shown in FIG. 16.
Figure 23:
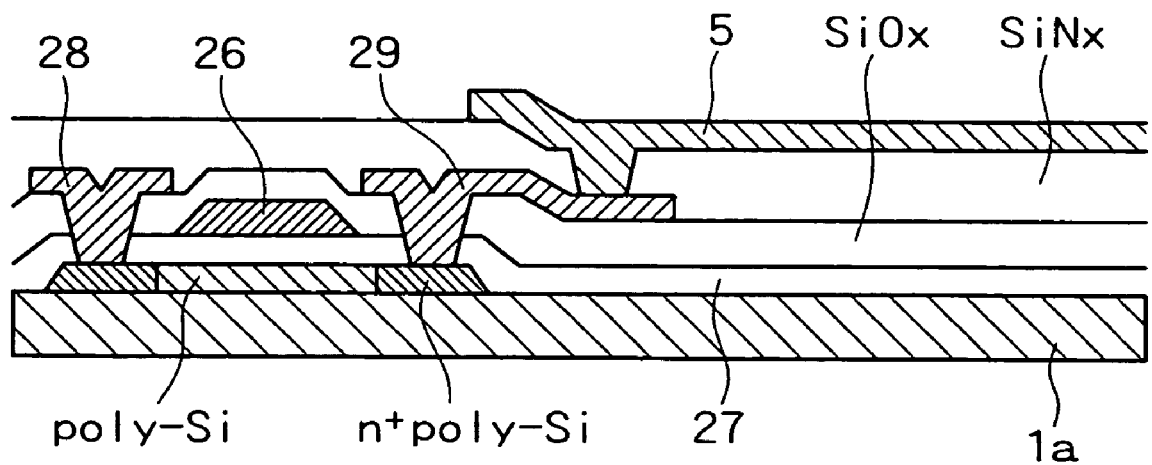
FIG. 23 is a diagram illustrating a step of producing the array of transistors on the substrate shown in FIG. 16.

A silicon nitride film (SiN$_x$) (about 500 nm thick) is formed by using a plasma CVD apparatus, with the substrate kept at about 300° C., as shown in FIG. 22. This silicon nitride film functions as the interlayer insulating film. The silicon nitride film (SiN$_x$) is patterned by dry etching through a photoresist layer 31 formed thereon so that the contact hole 32 is formed therein.

The photoresist is removed by ashing with oxygen plasma and treatment with an amine-based peeling solution as mentioned above, as shown in FIG. 23. An ITO film (about 100 nm thick) is formed in two stages as mentioned above. That is, in the initial stage, it is formed with heating in a non-oxidizing atmosphere, and in the second stage, it is formed in an oxygen-containing atmosphere. The ITO film is patterned by wet etching to form the transparent conductive film 5. The two-stage process forms an oxide film (1 to 10 nm thick) containing less than 44 atom % of oxygen in the interface between the drain electrode 29 (which is an aluminum alloy film) and the transparent conductive film 5, which are in direct contact with each other. This oxide film reduces contact resistance between them.

Finally, annealing is performed at about 350° C. for about 1 hour to stabilize the characteristic properties of the transistor. Thus the substrate (with TFT array) is completed.

The substrate (with TFT array) according to the second embodiment and the display device incorporated with this substrate produce the same effect as that produced in the first embodiment mentioned above. Incidentally, the aluminum alloy layer in both the first and second embodiments may be used as the reflecting electrode for the display device of reflection type.

Incidentally, the above-mentioned transparent conductive film 5 should preferably be formed from indium tin oxide or indium zinc oxide. The above-mentioned aluminum alloy film should be formed in such a way that the alloying component dissolving in the non-equilibrium state partly or entirely becomes included in the concentrated layer, so that its resistivity is reduced below 8 μΩ·cm, preferably below 5 μΩ cm. In addition, the contact resistance can be significantly reduced if there exists an oxide film (1 to 10 nm thick) containing less than 44 atom % of oxygen in the interface between the aluminum alloy film and the transparent conductive film.

The above-mentioned aluminum alloy film may be formed by vapor deposition or sputtering, with the latter being preferable.

The substrate (with TFT array) completed as mentioned above is incorporated into the flat display device (liquid crystal display device) as shown in FIG. 1.

The surface of the substrate (with TFT array) is coated with polyimide. After drying, the polyimide coating is made into an alignment layer by rubbing.

The opposing substrate 2 is a glass plate, which has a chromium shielding film 9 with a matrix pattern. In a gap between adjacent shielding films 9 is formed a plastic color filter 8 of red, green, or blue. On the shielding film 9 and the color filter is formed the common electrode 7 which is an ITO transparent conductive film. In this way the opposing electrode is completed. The opposing electrode is coated with polyimide. After drying, the polyimide film is made into the alignment layer 11 by rubbing.

The substrate 1 (with TFT array) and the opposing substrate 2 are put together, with their alignment layers facing each other. A certain gap is maintained between the two substrate by interposing spacers 15 between them. The gap is sealed with a plastic sealant 16, except for an opening through which the liquid crystal is introduced.

The resulting empty cell is placed in an evacuated container, with the opening dipped in liquid crystal. The pressure in the container is gradually restored to the atmospheric pressure, so that the empty cell is filled with the liquid crystal, and the opening is sealed. Finally, the polarizers 10 are attached to the both sides of the filled cell. In this way the liquid crystal panel is completed.

The liquid crystal panel is electrically connected to the driver circuit to drive the liquid crystal display device, as shown in FIG. 1. The driver circuit is arranged at the side or rear of the liquid crystal panel. The liquid crystal panel is fit into the frame 23 which has an opening to define the display area of the liquid crystal panel and which has the back light 22 and the light guide plate 20 for the surface light source. In this way the liquid crystal display device is completed.

EXAMPLES

Table 1 shows the results of measurements of contact resistance between the transparent conductive film 5 (on the substrate with TFT array) and the aluminum alloy film, which are in direct contact with each other.

The experiments for measurements were carried in the following manner.
(1) Constitution of transparent conductive film: Indium tin oxide (ITO) composed of indium oxide and 10 wt % of tin oxide; or indium zinc oxide (IZO) composed of indium oxide and 10 wt % of zinc oxide. The film thickness is 200 nm in both cases.
(2) Constitution of aluminum alloy film: Aluminum alloy containing 2 atom % of Ni; or aluminum alloy containing 2 atom % of Ni and 0.6 atom % of Nd.
(3) Formation of transparent conductive film:

Condition A in the Initial Stage of Formation.
  Atmosphere gas: argon
  Pressure: 3 mTorr
  Sputter power density: 1.9 W/cm$^2$
  Film thickness: 20 nm Condition B in the Later Stage of Formation:
  Atmosphere gas: argon/oxygen mixed gas
  Pressure: 3 mTorr (argon partial pressure: 2.98 mTorr; oxygen partial pressure: 0.02 mTorr)
  Sputter power density: 1.9 W/cm$^2$
  Film thickness: 180 nm
(4) Heating condition: Heating is controlled so that the substrate is at room temperature or 150° C. while the ITO film is being formed.

Incidentally, Experiment No. 10 was carried out in such a way that the ITO film was formed directly on the aluminum alloy film which had been patterned and then patterned so that a contact of 80 μm square was formed. In this experiment, the SiN film was not formed and etching with fluorine plasma was not performed.

Figure 24:
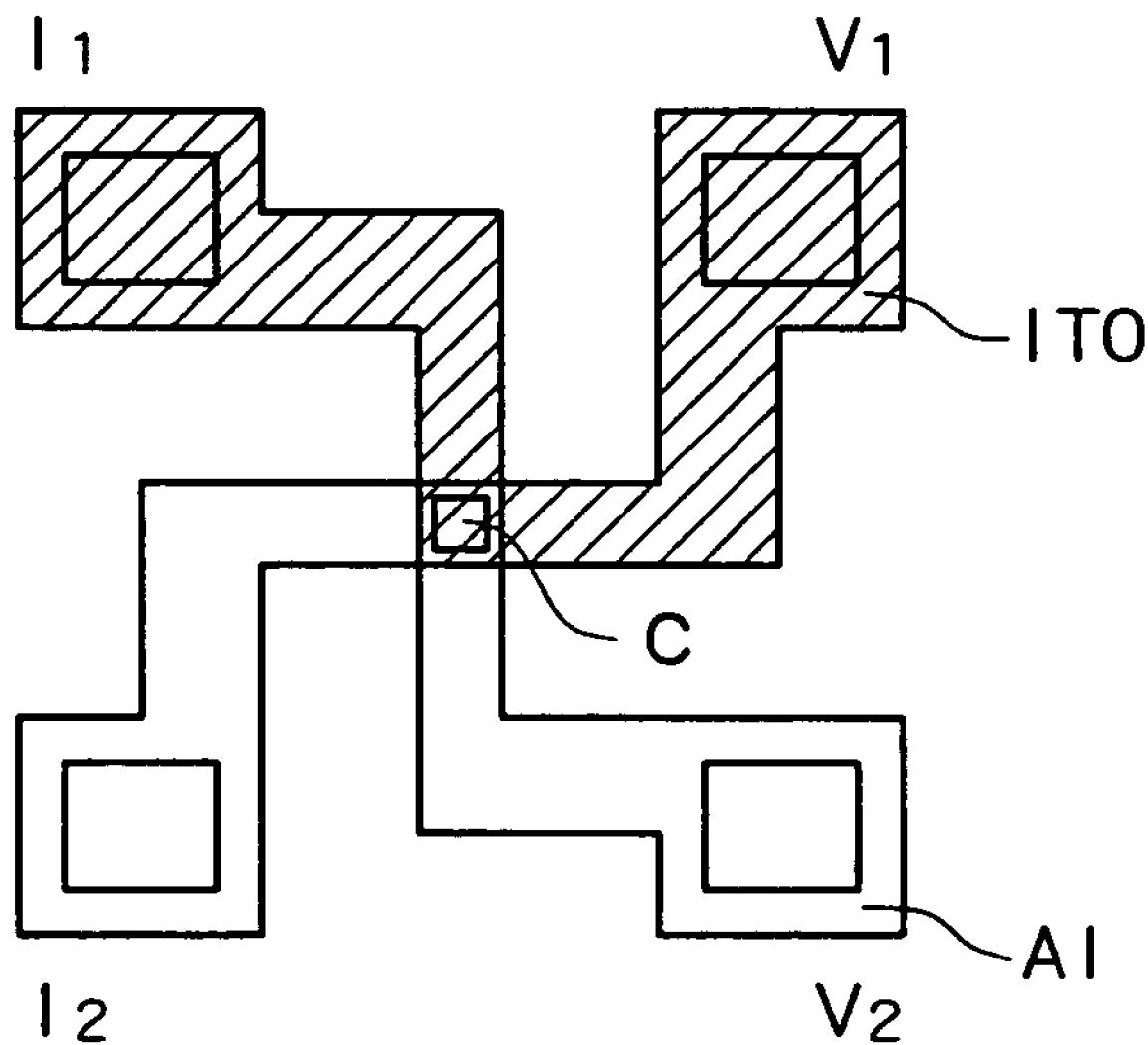
FIG. 24 is a diagram illustrating the Kelvin pattern used to measure contact resistance between the aluminum alloy film and the transparent conductive film.

(5) Measurement of contact resistance: By four-terminal measurement with a Kelvin pattern as shown in FIG. 24. Current I is passed through $I_1$ and $I_2$ (or through ITO (or IZO) and aluminum alloy) and voltage drop V across $V_1$ and $V_2$ (or ITO (or IZO) and aluminum alloy) is monitored. The contact resistance R at the contact C is calculated from $R=(V_2-V_1)/I$. The Kelvin pattern was prepared in the following manner.

The Ni content in the aluminum alloy was determined by ICP (induction coupled plasma) emission analysis. The thickness of the Ni-concentrated layer and the oxide film was measured by observing the cross section under a TEM. The Ni content in the Ni-concentrated layer and the oxygen content in the oxide layer were determined by EDX for the same sample as used to observe the cross section under a TEM.

A silicon wafer (in place of a glass substrate) is coated with a thermal oxide film of $SiO_2$ (400 nm thick) for insulation. On the oxide film is formed by sputtering an aluminum alloy film (300 nm thick). After patterning, an insulating film of $SiN_x$ (300 nm thick) is formed thereon by CVD method. The coated silicon wafer undergoes heat treatment for 1 hour in a film-forming vacuum chamber. A pattern for contact hole (80 μm square) is made by photo-lithography. A contact hole is made by etching with fluorine plasma. On the aluminum alloy film is formed by sputtering an ITO film or IZO film (200 nm thick) according to the two-stage process mentioned above within 8 hours. The ITO film or IZO film is patterned.

The contact resistance between the aluminum alloy film and the ITO film (or IZO film) was measured by using a four-terminal manual prober and a semiconductor parameter analyzer "HP4156A" (from Hewlett Packard). The contact resistance R measured by this method is represented by $R=(V_2-V_1)/I$. The measuring method gives a value of pure resistance at the contact between ITO (or IZO) and aluminum alloy, with the effect of wiring resistance eliminated.

In the meantime, resistance of direct contact between ITO film and pure aluminum is $1.5 \times 10^5$ Ω and resistance of direct contact between ITO film and Al—Nd alloy (typical aluminum alloy for wiring) is $8.4 \times 10^4$ Ω. By contrast, resistance of indirect contact between ITO film and Al—Nd alloy, with barrier metal of Mo interposed between them, is $1.0 \times 10^1$ Ω (in conventional structure).

In the foregoing examples of the present invention, the contact resistance at the contact hole (80 μm square) is $1.2 \times 10^{10}$ Ω for Al—Ni alloy wiring, $1.5 \times 10^1$ Ω for Al—Ni—Nd alloy wiring, and $1.3 \times 10^1$ Ω for Al—Ni—Y alloy wiring, each alloy wiring having an oxygen-poor oxide film formed at the contact interface. These resistance values are approximately equal to those of conventional structure having a barrier metal of Mo.

The liquid crystal display device provided with the substrate according to the embodiment of the present invention is comparable in yields and display quality to conventional ones in which the ITO film has a barrier metal. Thus, according to the present invention, it is possible to produce liquid crystal display devices comparable to conventional ones, without requiring barrier metal.

Omission of barrier metal simplifies manufacturing steps and reduces production cost.

According to the present invention, the transistor electrodes are formed from an aluminum alloy containing specific elements in place of pure aluminum or conventional aluminum alloy (or Mo—W film), such that there exists an oxide film with a limited oxygen content at the contact interface. This structure permits direct contact with the transparent conductive film, simplifies manufacturing steps, and greatly reduces production cost.

What is claimed is:

1. A display device which comprises a substrate, thin film transistors and a transparent conductive film which are formed on the substrate, and an aluminum alloy film which electrically connects the thin film transistors to the transparent conductive film, such that there exists an oxide film of said aluminum alloy at the interface between said aluminum alloy film and said transparent conductive film, said oxide film having a thickness of 1 to 10 nm and containing oxygen in an amount no more than 44 atom %.

2. The display device as defined in claim 1, wherein said aluminum alloy film contains at least one species of alloy component selected from the group consisting of Au, Ag, Zn, Cu, Ni, Sr, Sm, Ge, and Bi in an amount of 0.1 to 6 atom %.

3. The display device as defined in claim 2, wherein said aluminum alloy film contains at least Ni.

4. The display device as defined in claim 3, wherein there exists a Ni-concentrated layer having a thickness of 0.5 to 10 nm at the interface between said aluminum alloy film and said oxide film, and said Ni-concentrated layer has an

TABLE 1

| Sample No. | Elements in aluminum alloy (at %) | Condition of ITO film formation | ITO film forming temperature (° C.) | Thickness of Ni-concentrated layer (nm) | Ni content in Ni-concentrated layer (at %) | Thickness of oxide film (μm) | Oxygen content in oxide film (at %) | Contact resistance (Ω) | Electrical conductivity of ITO (mΩ · cm) |
|---|---|---|---|---|---|---|---|---|---|
| 1 | 2% Ni | A and B | RT | 1.5 | 8.1 | 4-4.5 | 39.8 | 13 | 0.25 |
| 2 | 2% Ni | A only | 150 | 1.5 | 7.9 | 4 | 39.6 | 3-33 | 0.8 |
| 3 | 2% Ni | B only | RT | 1.5 | 8 | 5.5 | 44.6 | 750 | 0.25 |
| 4 | 2% Ni | B only | 150 | 1.5-2 | 8.3 | 5 | 42.6 | 250 | 0.1 |
| 5 | 2% Ni | A and B | 150 | 1.5-2 | 8.1 | 4-4.5 | 40.2 | 12 | 0.1 |
| 6 | 0.1% Ni | A and B | 150 | 1-1.5 | 1.7 | 3.5-4 | 41.8 | 317 | 0.1 |
| 7 | 0.1% Ni | A only | 150 | 1-1.5 | 1.7 | 5.5 | 46 | 3620 | 0.8 |
| 8 | 2% Ni-0.6% Nd | A and B | RT | 1.5 | 7.7 | 4 | 40 | 17 | 0.25 |
| 9 | 2% Ni-0.6% Nd | A and B | 150 | 1-1.5 | 8.2 | 4 | 40.2 | 15 | 0.1 |
| 10 | 2% Ni-0.6% Y | A and B | 150 | 1-1.5 | 8.4 | 4.5 | 39.2 | 18 | 0.1 |
| 11 | 2% Ni-0.6% Fe | A and B | 150 | 1-1.5 | 7.9 | 4 | 40.1 | 21 | 0.1 |
| 12 | 2% Ni-0.6% Co | A and B | 150 | 1-1.5 | 8.1 | 4 | 40.4 | 20 | 0.1 |
| 13 | 2% Ni | A and B | RT | — | — | 5 | 43 | 100 | 0.25 |

Sample No. 13 was prepared, with the SiN film forming step and dry etching step omitted.

average Ni concentration which is more than twice the average Ni concentration in said aluminum alloy film.

5. The display device as defined in claim 1, wherein said aluminum alloy film additionally contains at least one species of alloy component selected from the group consisting of Nd, Y, Fe, Co, Ti, Ta, Cr, Zr, and Hf in an amount of 0.1 to 6 atom %.

6. The display device as defined in claim 1, wherein said transparent conductive film is formed from indium tin oxide (ITO) or indium zinc oxide (IZO).

7. The display device as defined in claim 1, wherein said aluminum alloy film functions as a reflective film.

8. The display device as defined in claim 1, wherein said aluminum alloy film is coated with a transparent conductive film so that the resulting laminate functions as a tab connecting electrode.

9. A display device of passive matrix type, which comprises a substrate, a transparent conductive film, and an aluminum alloy film to electrically connect said transparent conductive film, such that there exists an oxide film of said aluminum alloy at the interface between said aluminum alloy film and said transparent conductive film, said oxide film having a thickness of 1 to 10 nm and containing oxygen in an amount no more than 44 atom %.

10. A method for producing a display device which comprises a step of forming an aluminum alloy on a substrate and subsequently forming a transparent conductive film (for electrodes) on said aluminum alloy film in a non-oxidizing gas atmosphere in the initial stage and in an oxygen-containing gas atmosphere in the second stage, thereby forming an oxide film of said aluminum alloy at the interface between said aluminum alloy film and said transparent conductive film, said oxide film having a thickness of 1 to 10 nm and containing oxygen in an amount no more than 44 atom %.

* * * * *

UNITED STATES PATENT AND TRADEMARK OFFICE
CERTIFICATE OF CORRECTION

PATENT NO.         : 7,365,810 B2                                   Page 1 of 1
APPLICATION NO. : 11/153331
DATED              : April 29, 2008
INVENTOR(S)        : Gotoh et al.

It is certified that error appears in the above-identified patent and that said Letters Patent is hereby corrected as shown below:

On the title page, Item (73), the Assignee information is incorrect. Item (73) should read:

-- (73) Assignee: Kabushiki Kaisha Kobe Seiko Sho (Kobe Steel, Ltd.), Kobe-shi    (JP) --

Signed and Sealed this

Fifteenth Day of July, 2008

JON W. DUDAS
*Director of the United States Patent and Trademark Office*